United States Patent
Miles

(10) Patent No.: US 9,733,141 B1
(45) Date of Patent: Aug. 15, 2017

(54) METHOD FOR MAKING MEASUREMENTS OF THE POST-COMBUSTION RESIDENCE TIME IN A GAS TURBINE ENGINE

(71) Applicant: The United States of America as represented by the Administrator of the National Aeronautics and Space Administration, Washington, DC (US)

(72) Inventor: Jeffrey H. Miles, Beachwood, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 298 days.

(21) Appl. No.: 14/694,235

(22) Filed: Apr. 23, 2015

Related U.S. Application Data

(63) Continuation-in-part of application No. 13/534,870, filed on Jun. 27, 2012, now Pat. No. 9,032,785.

(51) Int. Cl.
*G01M 15/14* (2006.01)
*G01L 11/04* (2006.01)

(52) U.S. Cl.
CPC .............. *G01L 11/04* (2013.01); *G01M 15/14* (2013.01)

(58) Field of Classification Search
CPC ............... F01D 21/003; F23N 2025/06; F23N 2041/20; F23N 5/00; G01M 15/14; G01L 11/04
See application file for complete search history.

(56) References Cited

U.S. PATENT DOCUMENTS

| | | | |
|---|---|---|---|
| 4,587,614 A | 5/1986 | Couch | |
| 4,607,337 A | 8/1986 | Rosenbush et al. | |
| 6,757,668 B1 | 6/2004 | Goebel et al. | |
| 6,782,314 B2 | 8/2004 | McBrien et al. | |
| 6,928,370 B2 | 8/2005 | Anuzis et al. | |
| 7,058,556 B2 | 6/2006 | Desai et al. | |
| 7,481,100 B2 | 1/2009 | Ponziani et al. | |
| 7,698,942 B2 | 4/2010 | Board | |
| 7,954,325 B2* | 6/2011 | Burd | F23R 3/04 60/752 |
| 8,668,434 B2* | 3/2014 | Karpman | F01D 21/003 415/7 |
| 9,032,785 B1* | 5/2015 | Miles | G01M 15/14 73/112.01 |
| 2009/0178494 A1 | 7/2009 | Liu et al. | |
| 2009/0274565 A1 | 11/2009 | White | |
| 2010/0057957 A1 | 3/2010 | Smilg et al. | |
| 2010/0161154 A1 | 6/2010 | Moeckly et al. | |
| 2010/0161196 A1 | 6/2010 | Goericke et al. | |

(Continued)

*Primary Examiner* — Freddie Kirkland, III
(74) *Attorney, Agent, or Firm* — Robert H. Earp, III

(57) ABSTRACT

A method of measuring a residence time in a gas-turbine engine is disclosed that includes measuring a combustor pressure signal at a combustor entrance and a turbine exit pressure signal at a turbine exit. The method further includes computing a cross-spectrum function between the combustor pressure signal and the turbine exit pressure signal, calculating a slope of the cross-spectrum function, shifting the turbine exit pressure signal an amount corresponding to a time delay between the measurement of the combustor pressure signal and the turbine exit pressure signal, and recalculating the slope of the cross-spectrum function until the slope reaches zero.

20 Claims, 33 Drawing Sheets

(56) References Cited

U.S. PATENT DOCUMENTS

| | | | |
|---|---|---|---|
| 2010/0161197 A1* | 6/2010 | Moeckly | G05B 23/0281 |
| | | | 701/99 |
| 2010/0174466 A1* | 7/2010 | Davis, Jr. | F02C 7/22 |
| | | | 701/100 |
| 2010/0281843 A1* | 11/2010 | Smith | F01D 17/08 |
| | | | 60/39.091 |
| 2011/0052370 A1* | 3/2011 | Karpman | F01D 21/003 |
| | | | 415/13 |

* cited by examiner

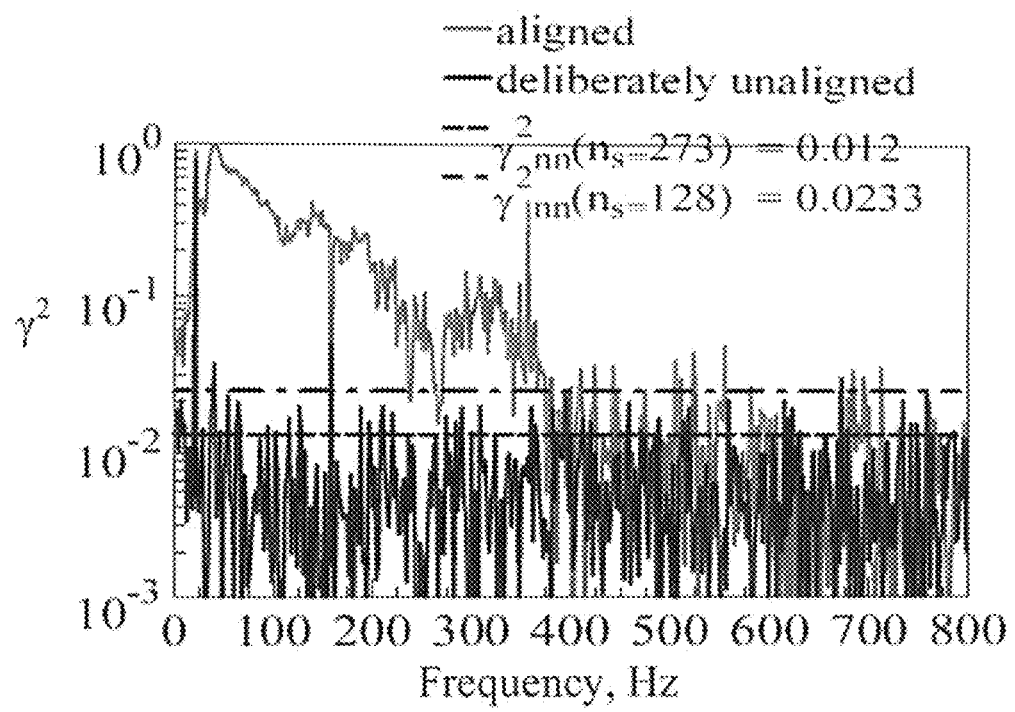
FIG. 3A - Coherence
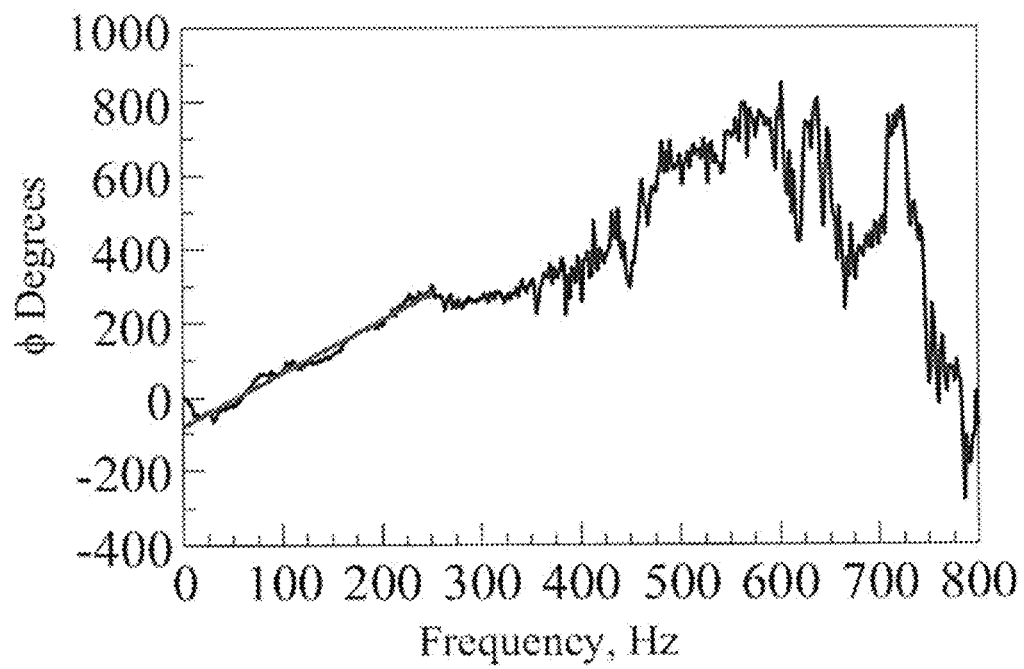
FIG. 3B – Cross-Spectrum Phase angle

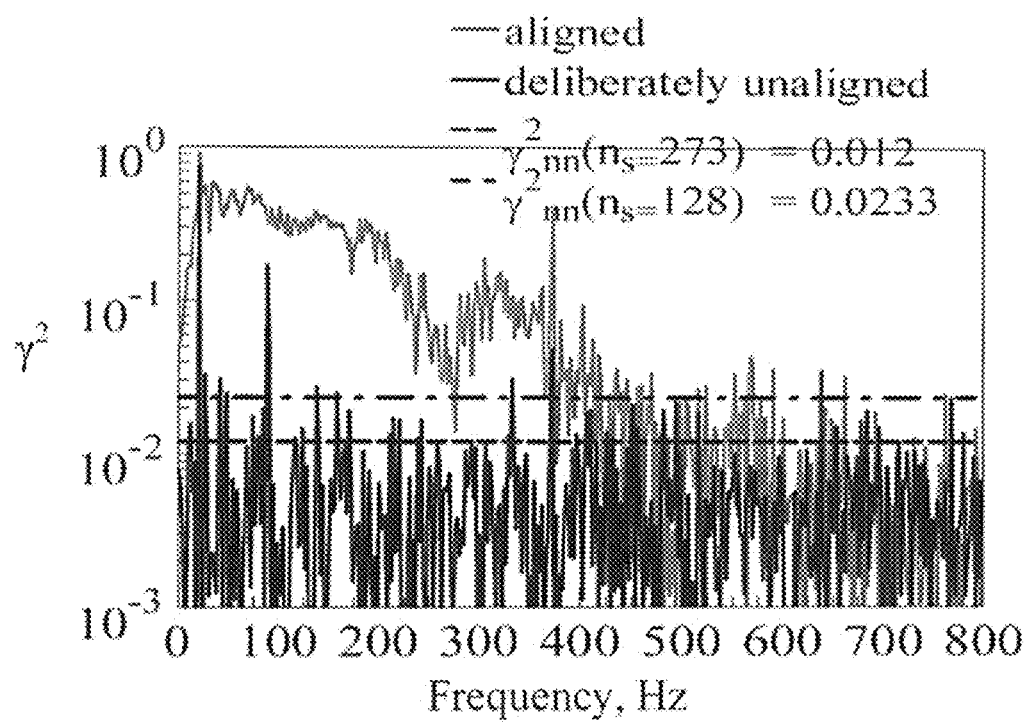
FIG. 4A - Coherence
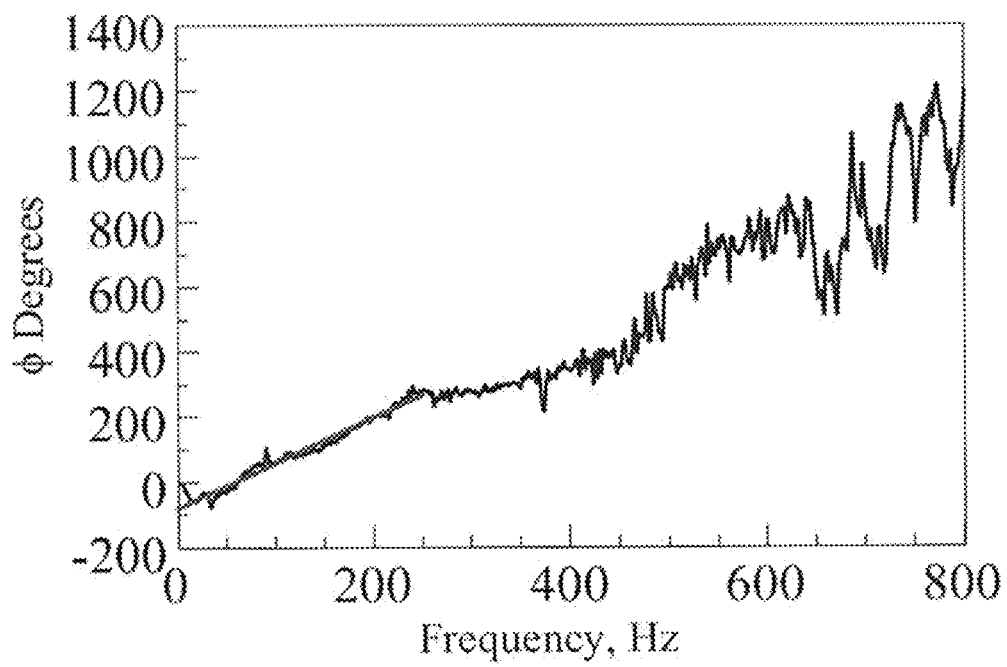
FIG. 4B – Cross-Spectrum Phase angle

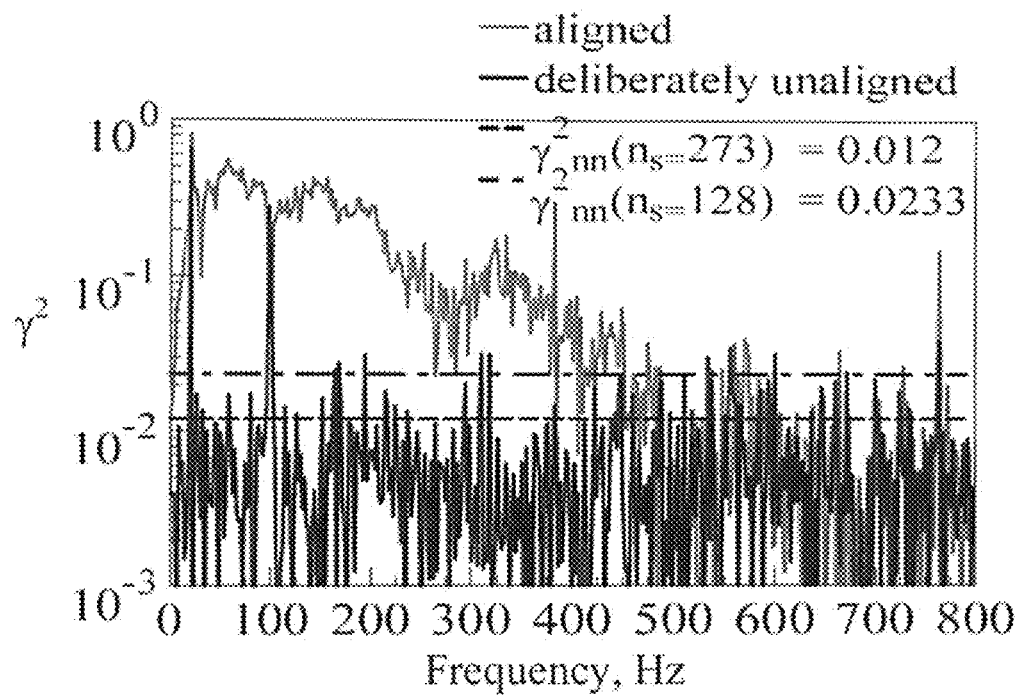
FIG. 5A – Coherence
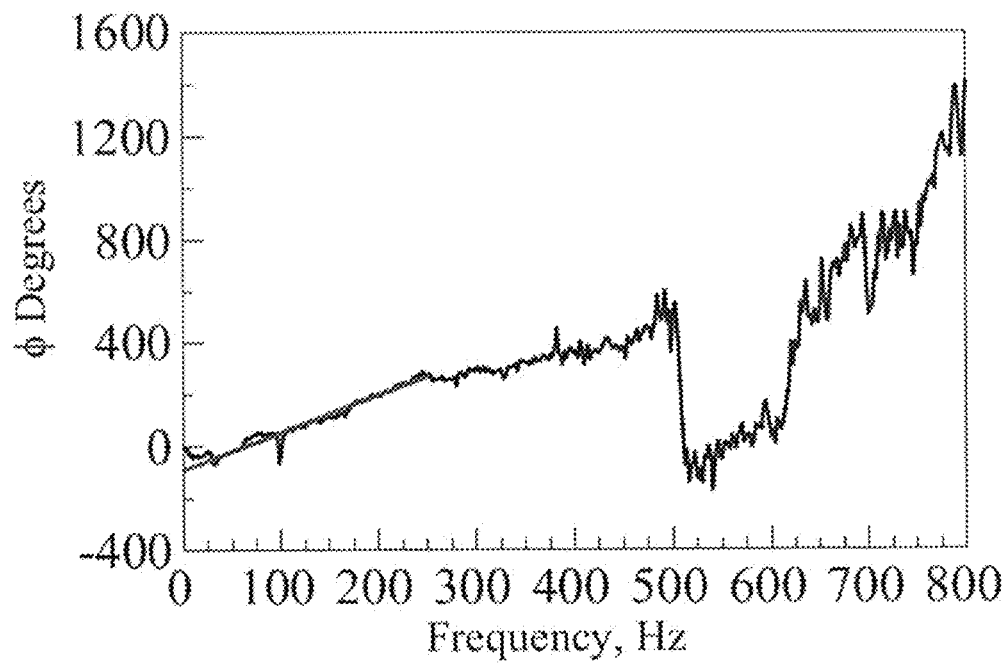
FIG. 5B – Cross-Spectrum Phase angle

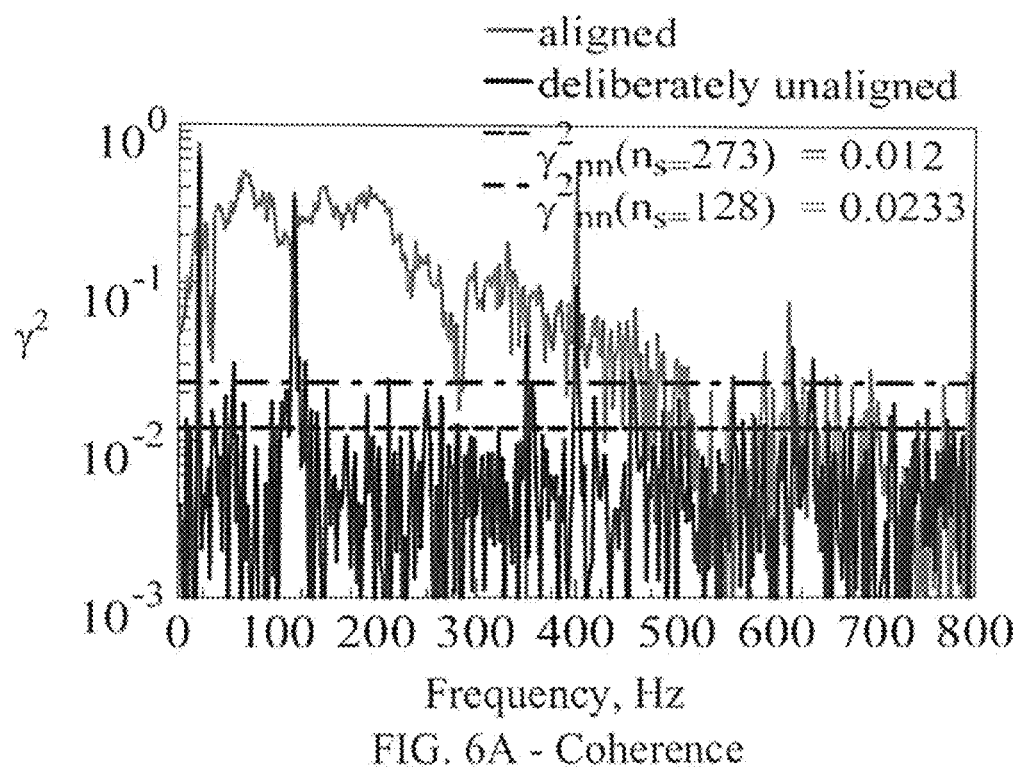
FIG. 6A - Coherence
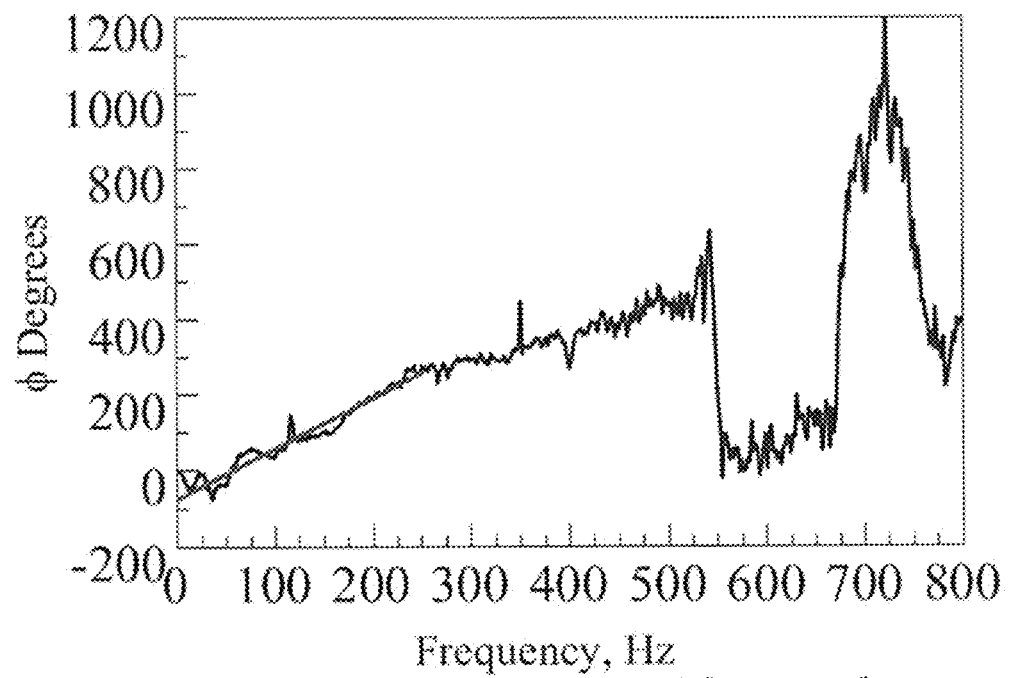
FIG. 6B – Cross-Spectrum Phase angle

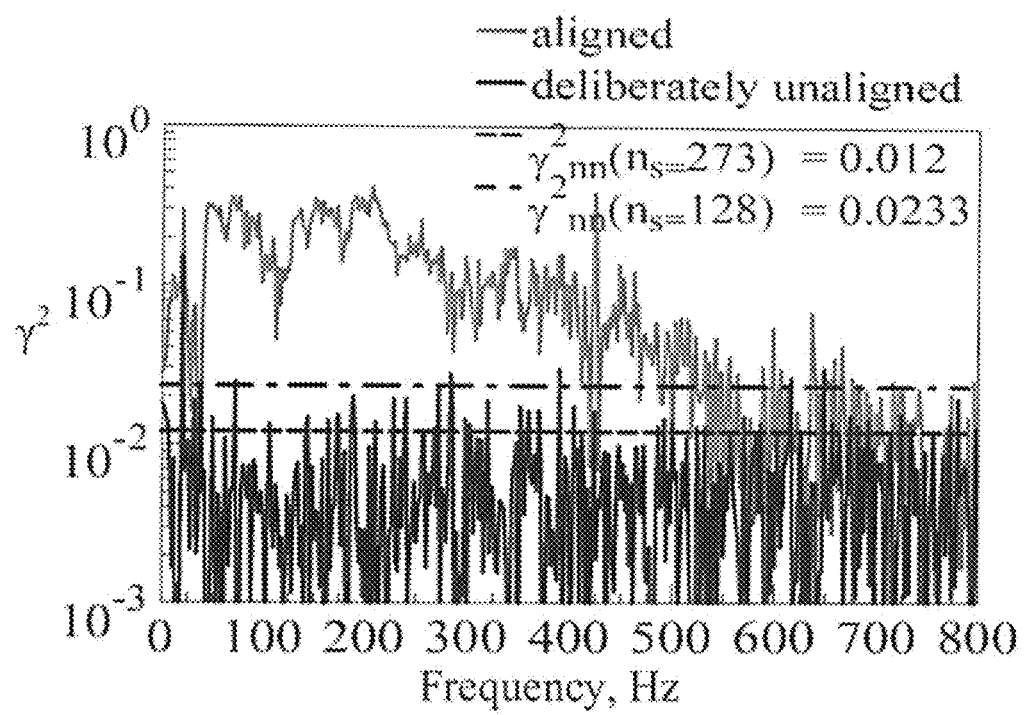
FIG. 7A - Coherence
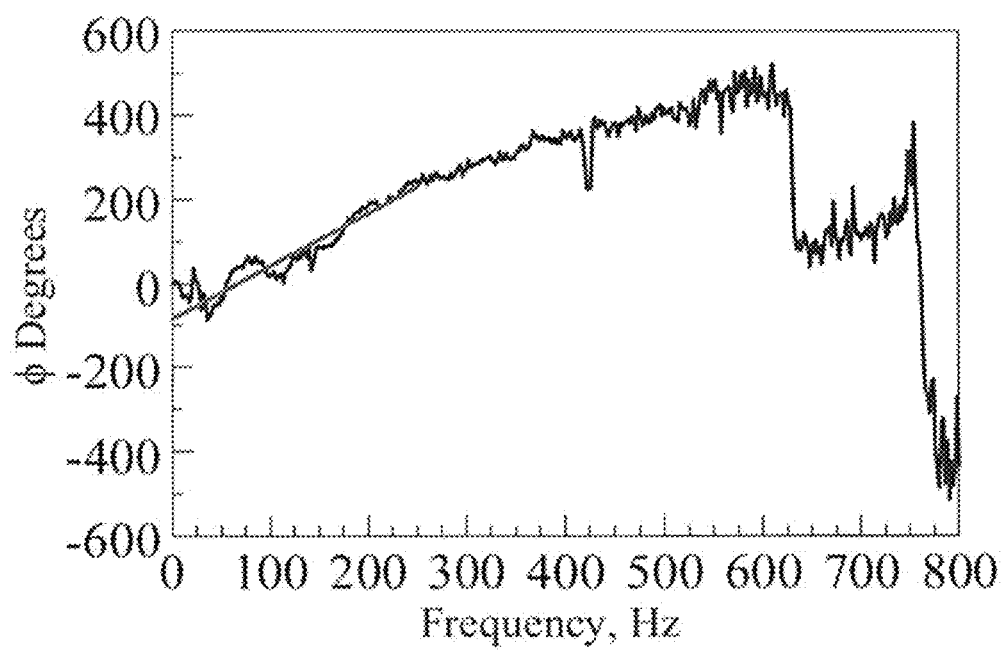
FIG. 7B – Cross-Spectrum Phase angle

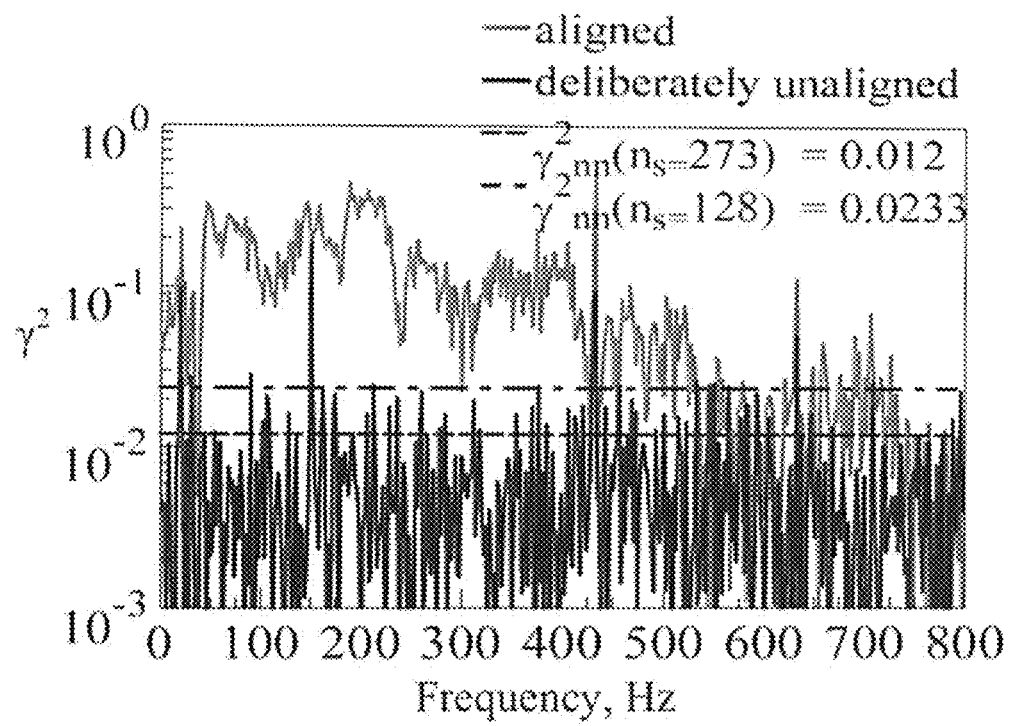
FIG. 8A – Coherence
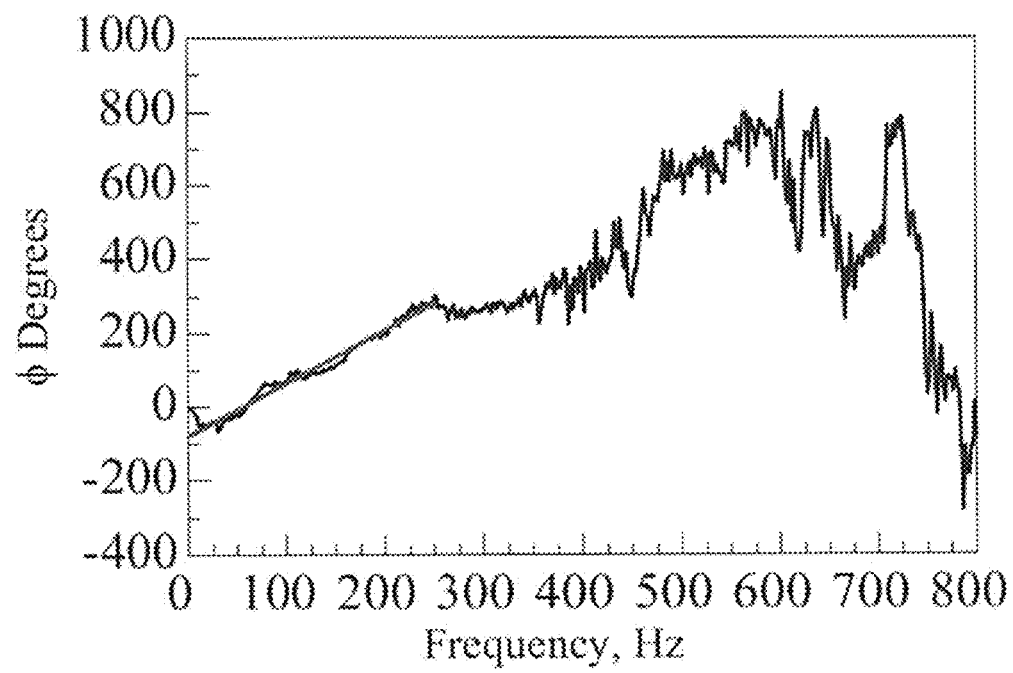
FIG. 8B – Cross-Spectrum Phase angle

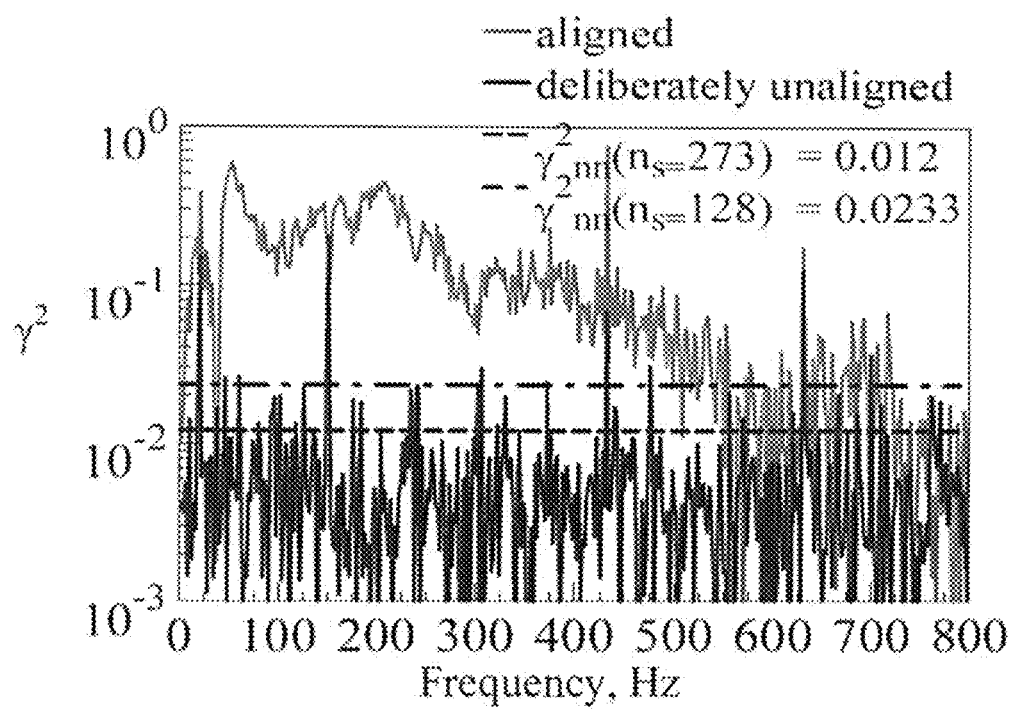
FIG. 9A - Coherence
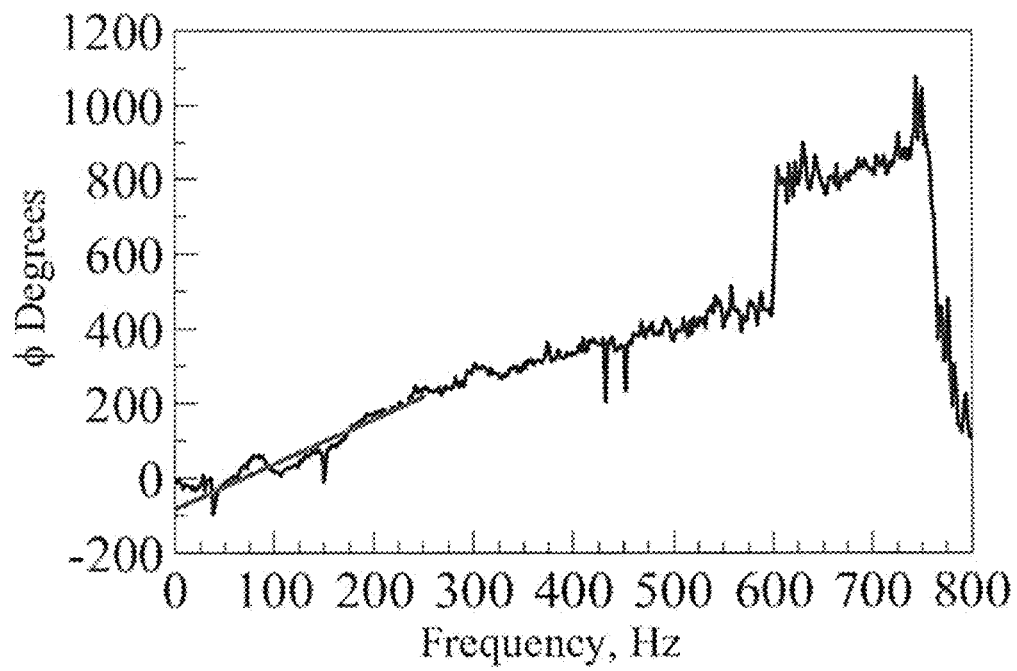
FIG. 9B – Cross-Spectrum Phase angle

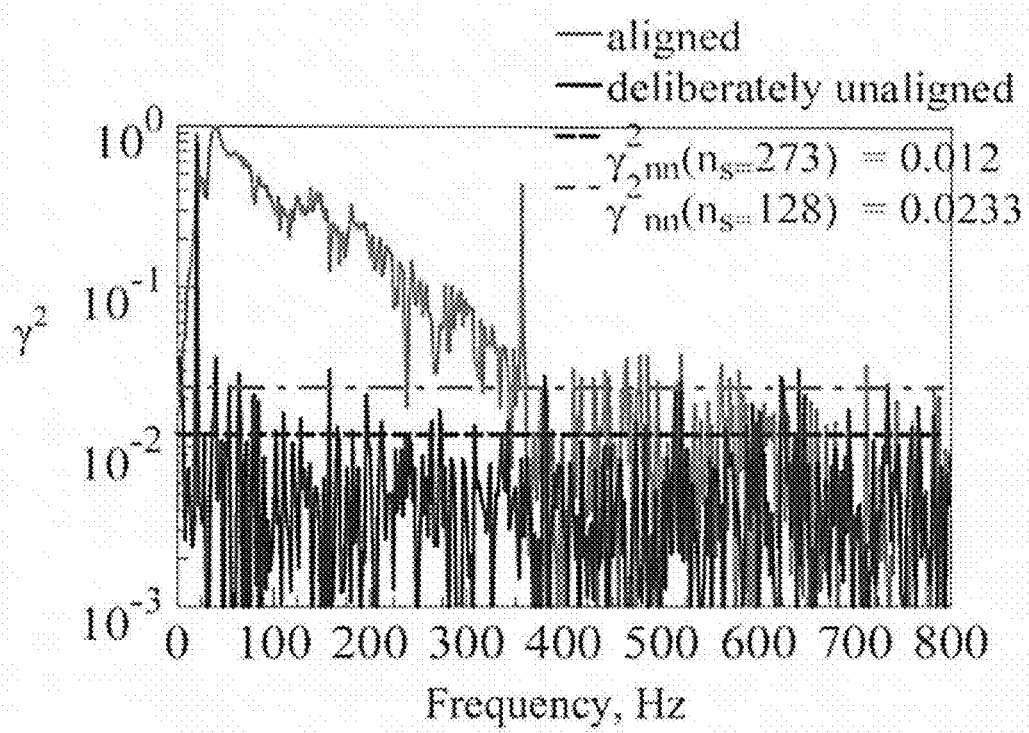
FIG. 10A - Coherence
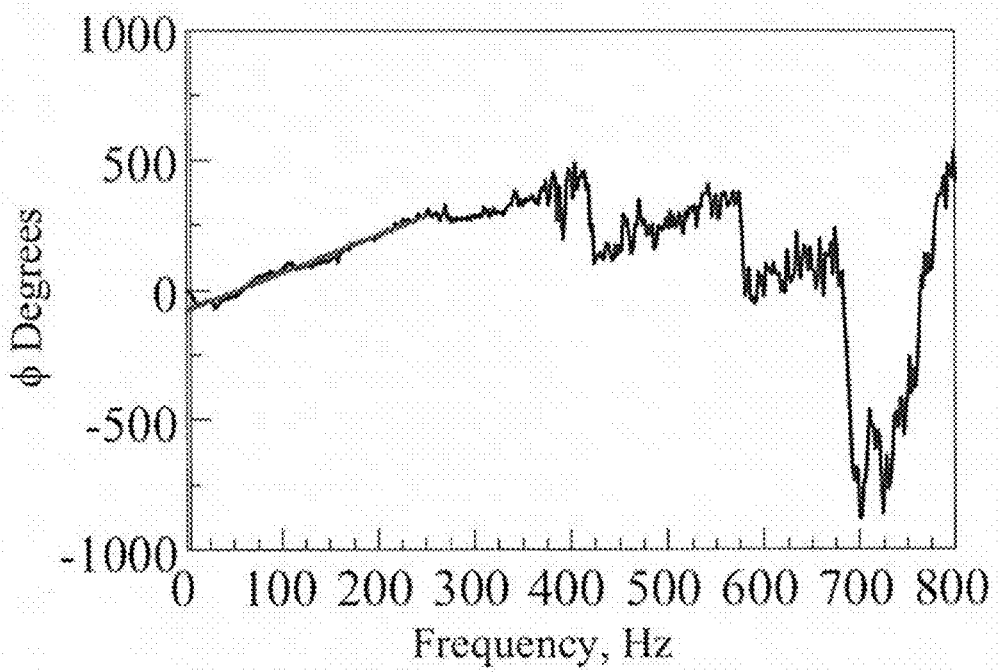
FIG. 10B – Cross-Spectrum Phase angle

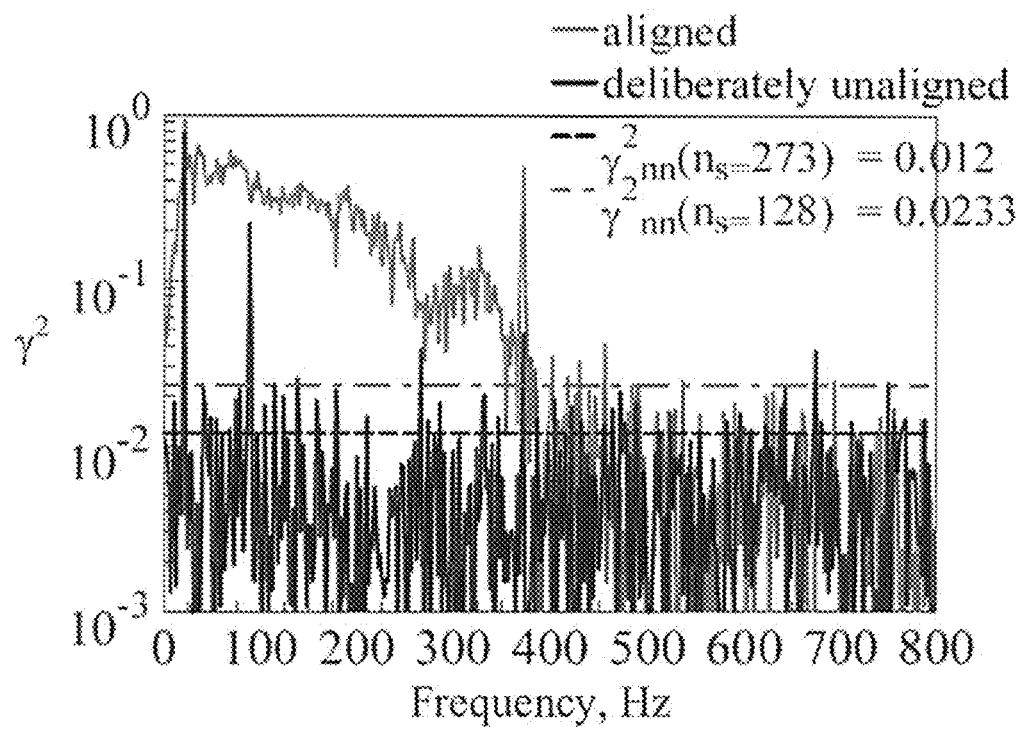
FIG. 11A - Coherence
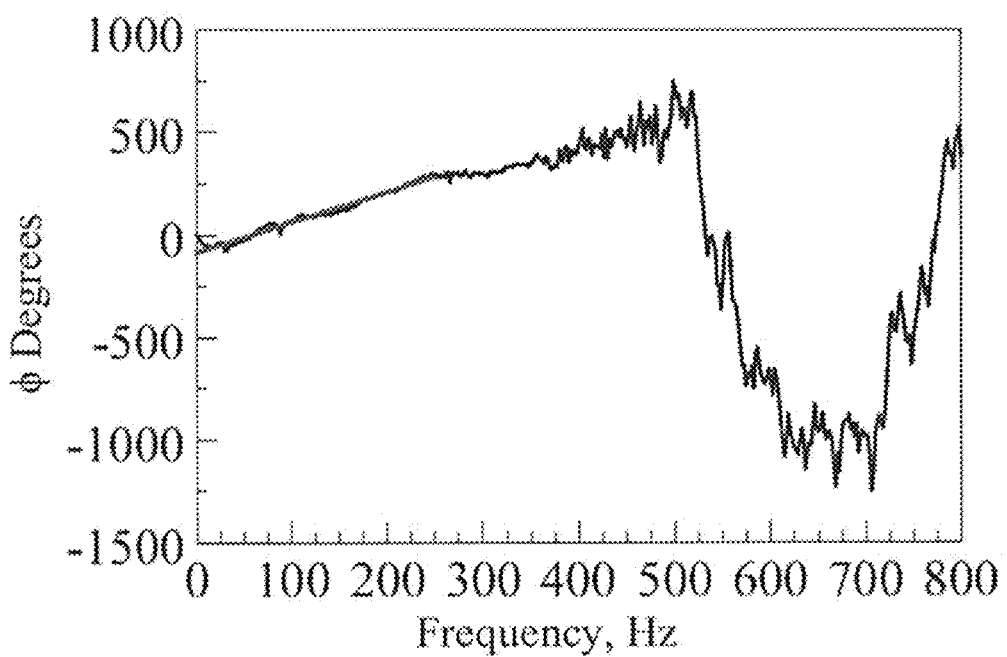
FIG. 11B – Cross-Spectrum Phase angle

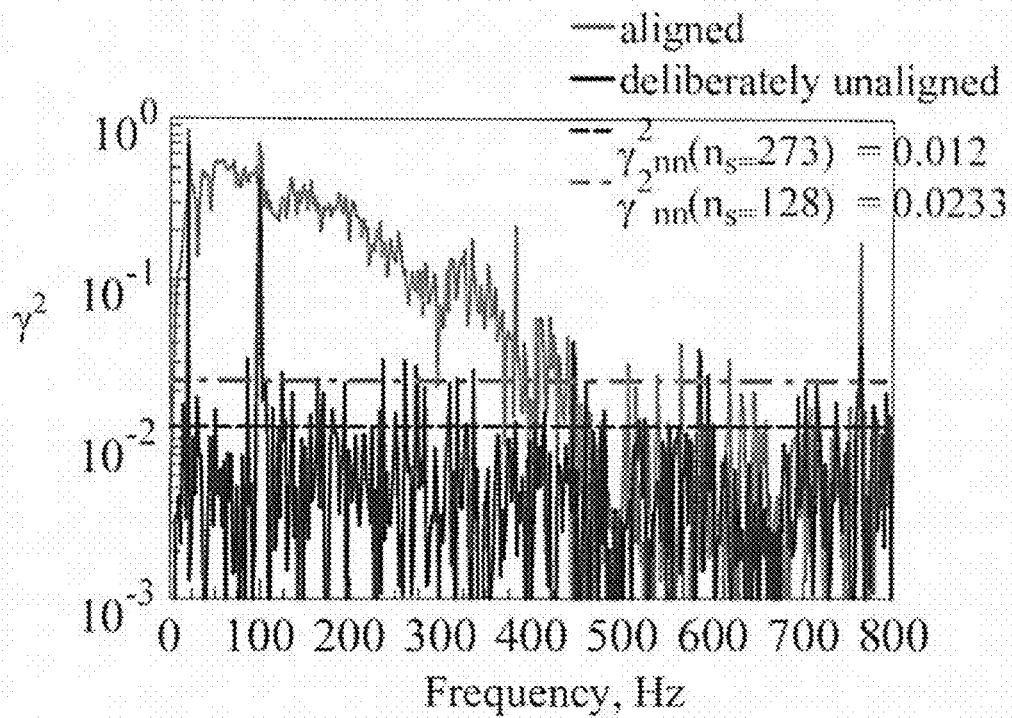
FIG. 12A – Coherence
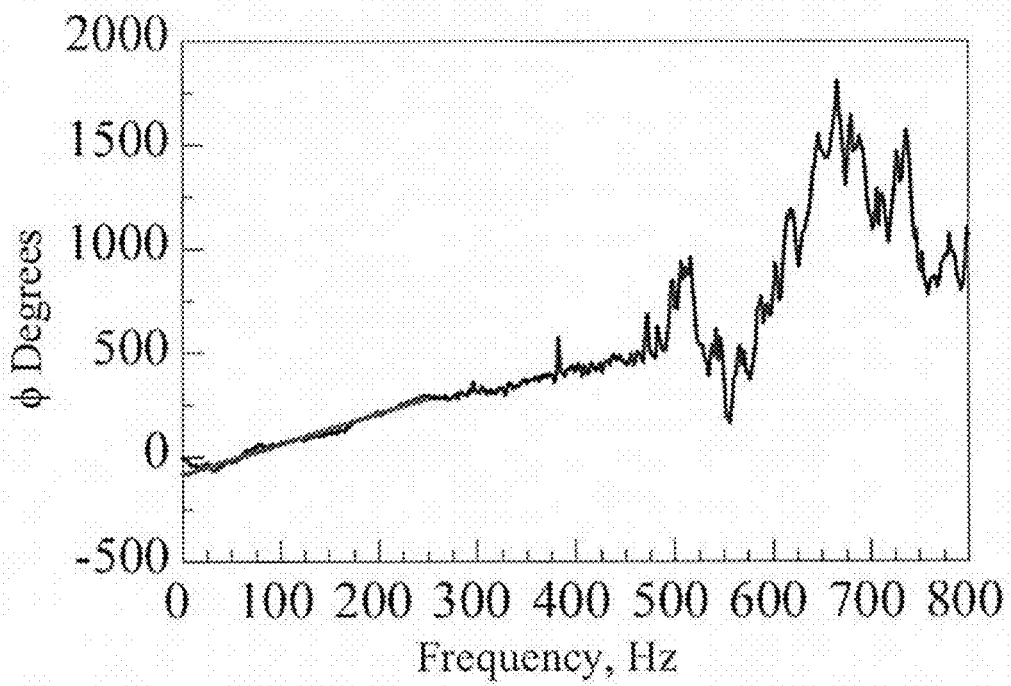
FIG. 12B – Cross-Spectrum Phase angle

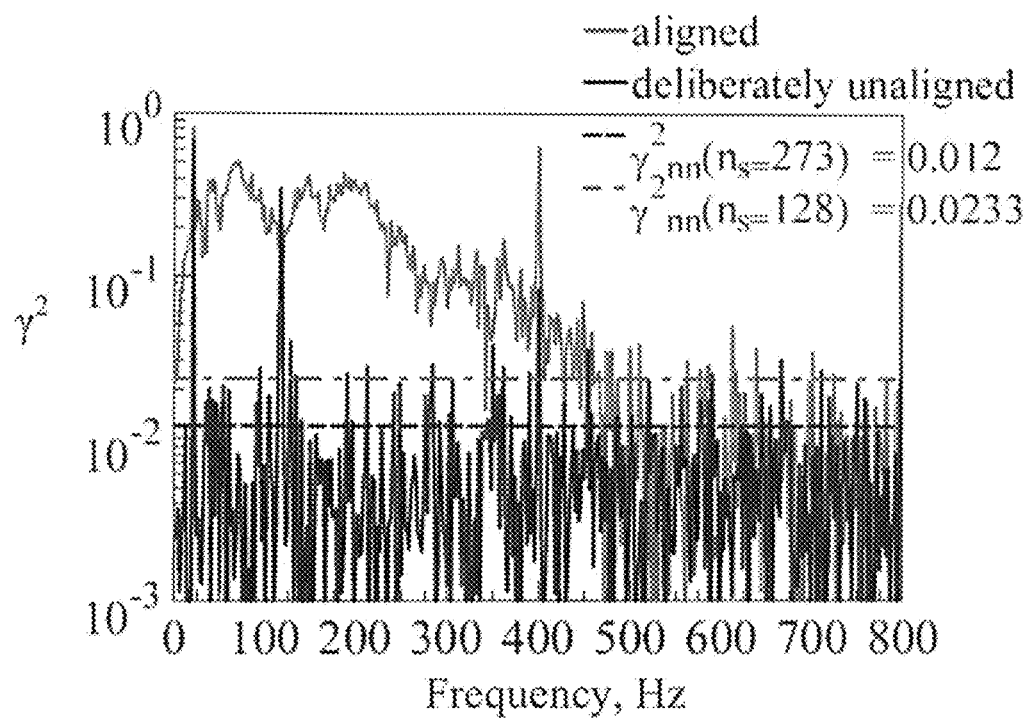
FIG. 13A - Coherence
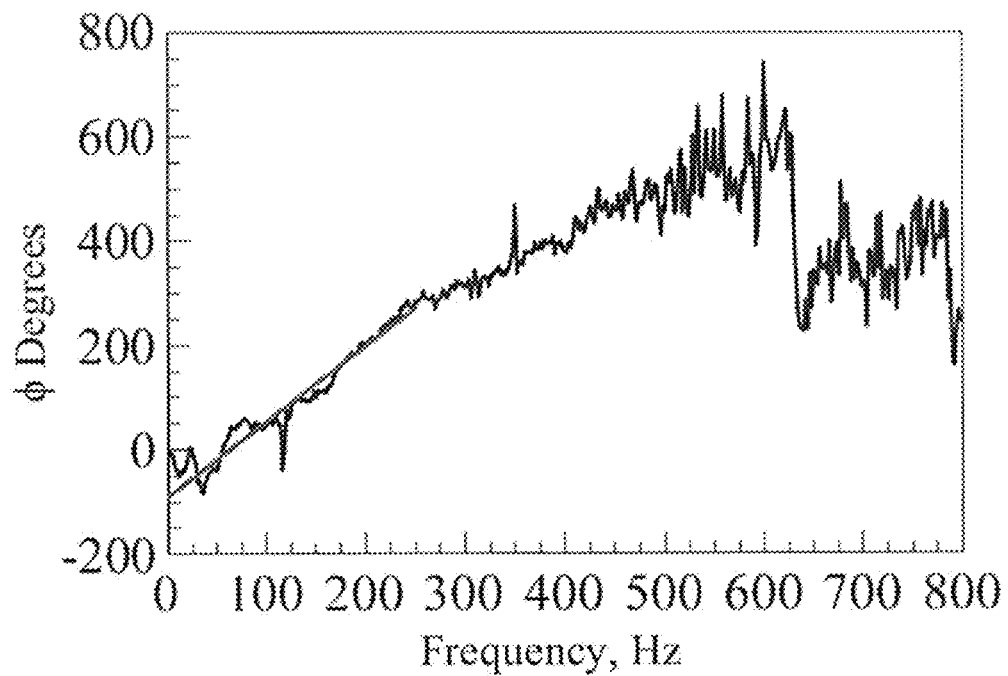
FIG. 13B – Cross-Spectrum Phase angle

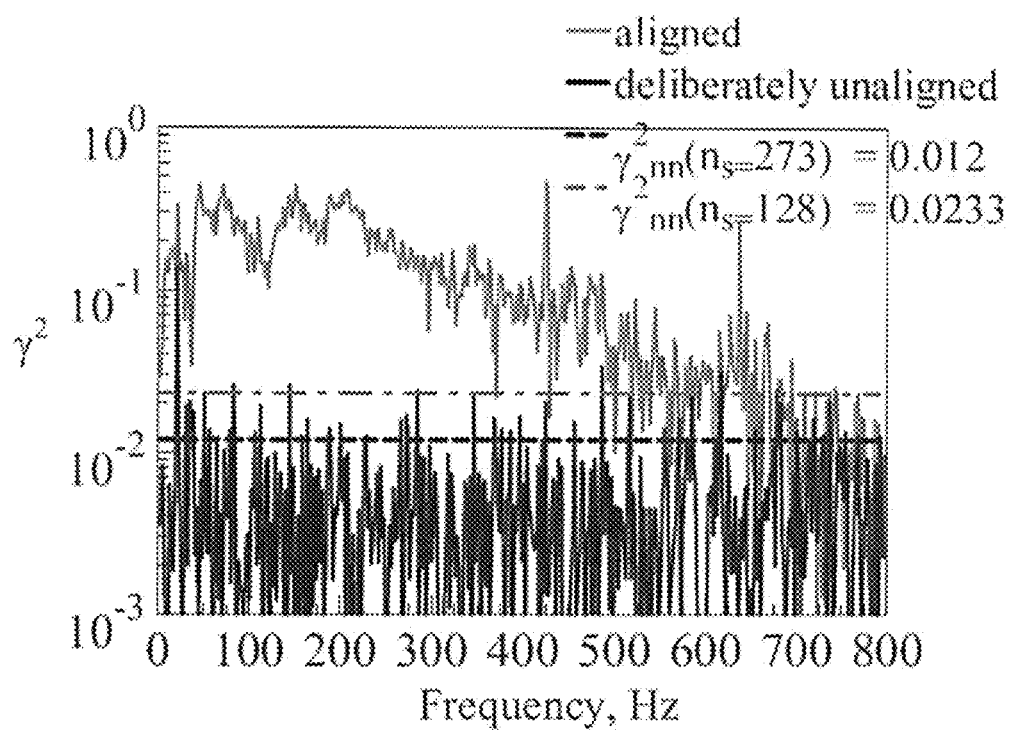
FIG. 14A - Coherence
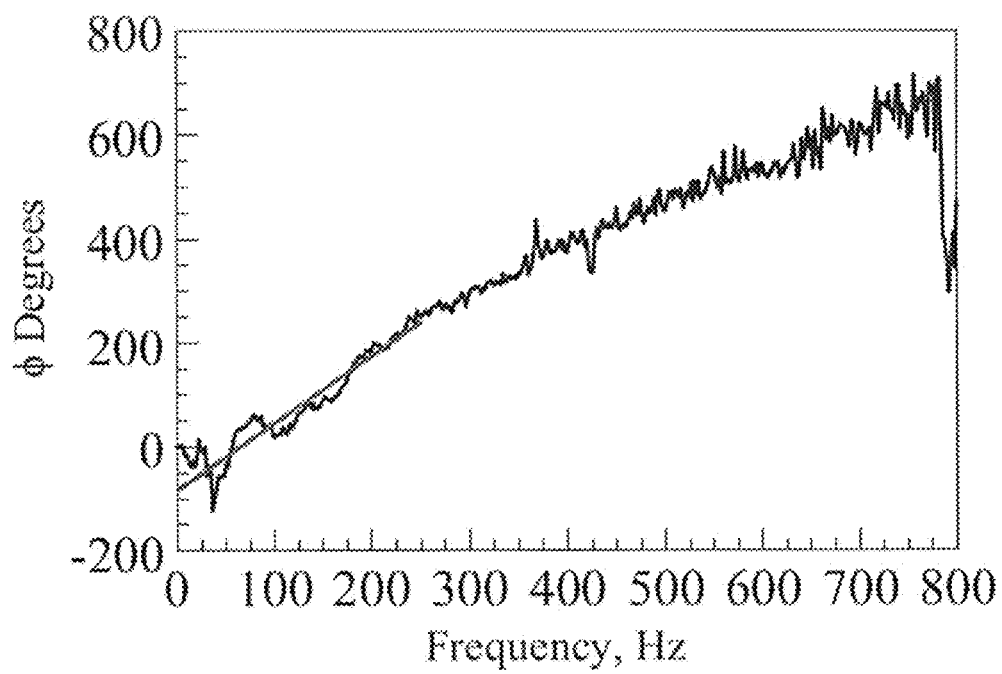
FIG. 14B – Cross-Spectrum Phase angle

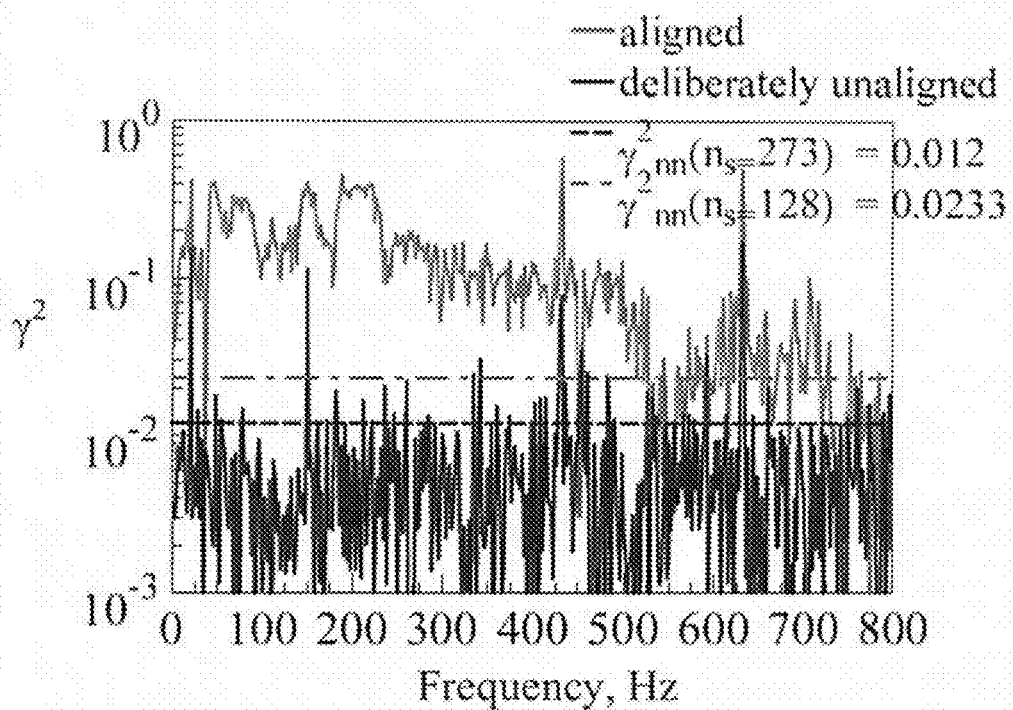
FIG. 15A - Coherence
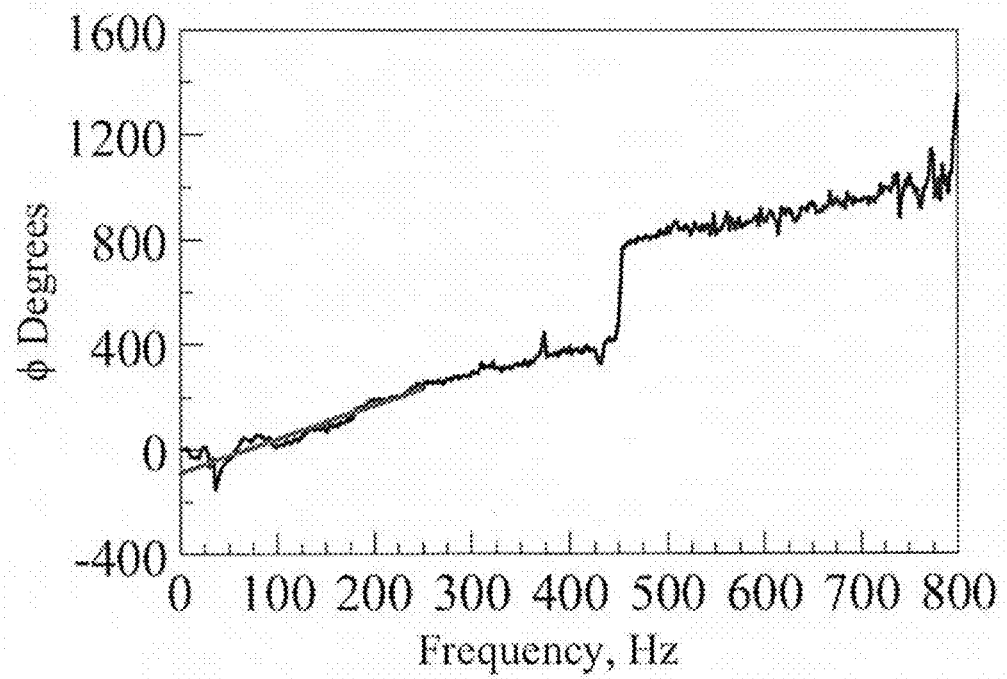
FIG. 15B – Cross-Spectrum Phase angle

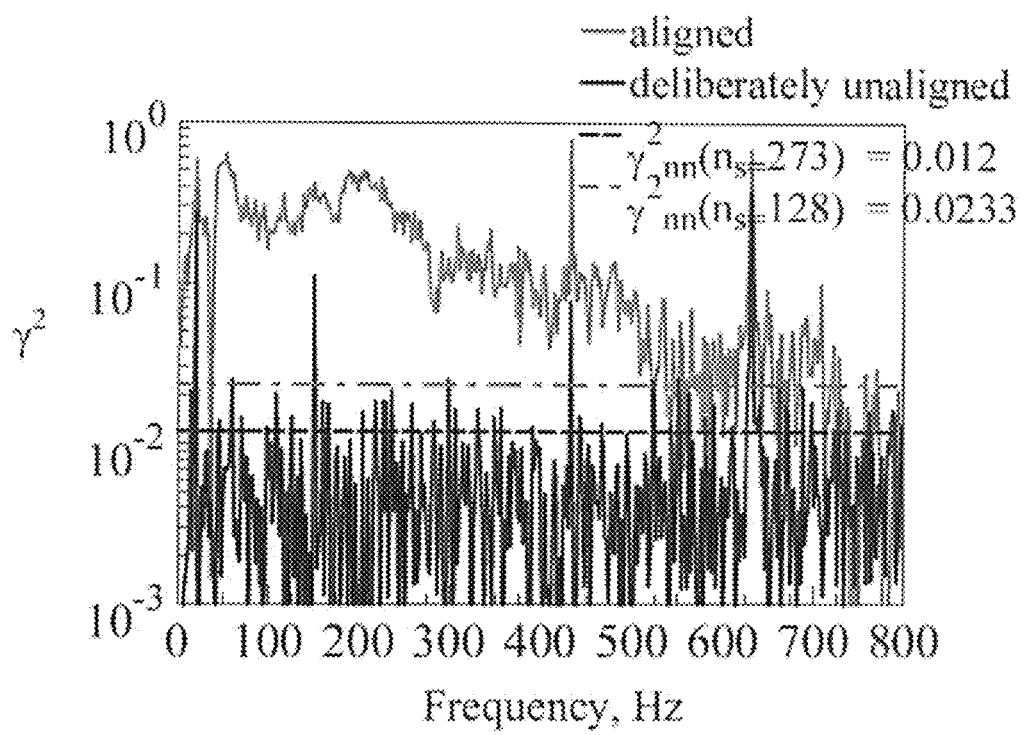
FIG. 16A - Coherence
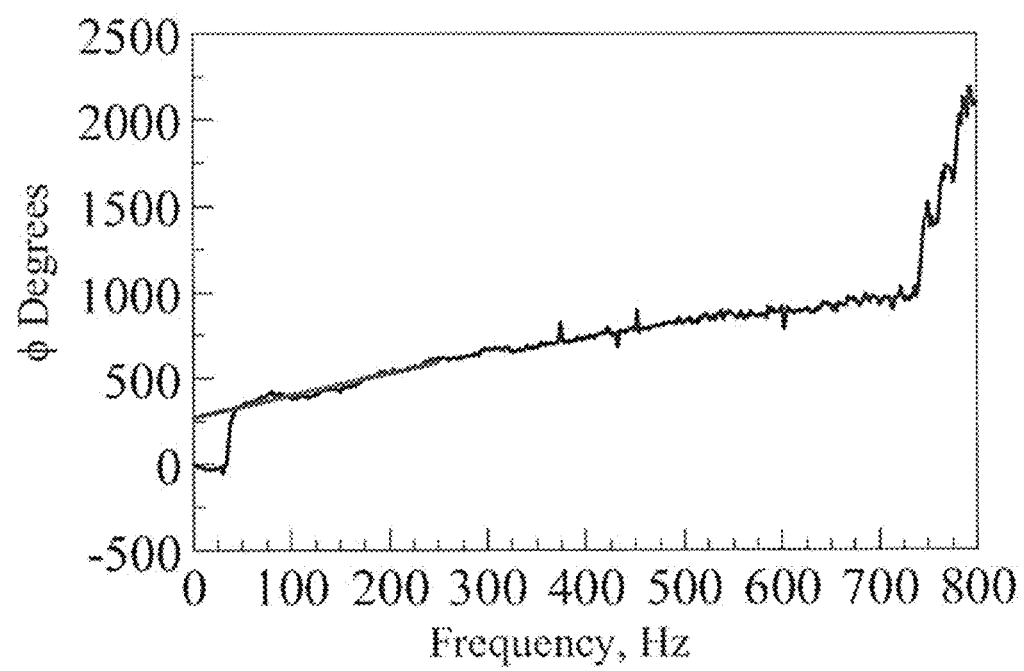
FIG. 16B – Cross-Spectrum Phase angle

METHOD FOR MAKING MEASUREMENTS OF THE POST-COMBUSTION RESIDENCE TIME IN A GAS TURBINE ENGINE

CROSS-REFERENCE TO RELATED APPLICATIONS

This application is Continuation-in-Part of pending U.S. patent application Ser. No. 13/534,870 entitled "METHOD FOR MAKING MEASUREMENTS OF THE POST-COMBUSTION RESIDENCE TIME IN A GAS TURBINE ENGINE" filed on Jun. 27, 2012, which claims the benefit of U.S. Provisional Patent application Ser. No. 61/503,855 entitled "METHOD FOR MAKING MEASUREMENTS OF THE POST-COMBUSTION RESIDENCE TIME IN A GAS TURBINE ENGINE" filed on Jul. 1, 2011. The entireties of the above-noted applications are herein incorporated by reference.

ORIGIN OF THE INVENTION

The invention described herein was made by an employee of the United States Government and may be manufactured and used only by or for the Government for Government purposes without the payment of any royalties thereon or therefore.

BACKGROUND

A challenging issue confronting the air transport system is the demand for the reduction of the emissions of oxides of nitrogen. The formation of thermal $NO_x$ in a gas turbine engine depends on the stoichiometry, the residence time linearly, and on the reaction temperature exponentially. Zeldovich thermal $NO_x$ may be produced by oxidation of atmospheric nitrogen in post flame gases. As turbine blade resistance to high temperatures improves, nitrogen production in the post-combustion zone may become more important. While residence time is not as significant as temperature in formula predicting $NO_x$ production, it is a necessary factor and should be as accurate as possible. The characteristic combustor residence time can be defined as the ratio of the combustor volume to the bulk (volumetric) flow rate. This value is estimated from geometry and operational data. Detailed geometrical and operational data from gas turbine engine manufacturers, however, is frequently unavailable. Furthermore, post-combustion residence time measurements are not available to verify analytical estimates. Consequently, in order to improve the technology to satisfy future emission prediction goals, a different concept for determining the characteristic post-combustor residence time is required.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation a different concept for determining characteristics of post-combustor residence time is disclosed. The concept is based on determining the post-combustion residence time delay due to convection of entropy at the flow speed in the combustor of a gas turbine engine over a range of operating conditions. It is evaluated from the slope of the combustor sensor signal/turbine exit signal pressure cross-spectrum phase angle over an appropriate frequency range where the measured signal can be attributed to indirect combustion noise.

In another aspect of the innovation, a method of measuring a residence time in a gas-turbine engine is disclosed the includes measuring a combustor pressure signal at a combustor entrance and a turbine exit pressure signal at a turbine exit, computing a cross-spectrum function between the combustor pressure signal and the turbine exit pressure signal, calculating a slope of the cross-spectrum function, shifting the turbine exit pressure signal an amount corresponding to a time delay between the measurement of the combustor pressure signal and the turbine exit pressure signal; and recalculating the slope of the cross-spectrum function until the slope reaches zero.

In yet another aspect of the innovation, a system to measure a post-combustion residence time in a gas-turbine engine is disclosed and includes a measurement component that measures combustion pressure signals, turbine exit pressure signals, and far-field pressure signals from far-field microphones, a receiving/calculation component that calculates a plurality of cross-spectrum functions based on the measured plurality of combustion pressure signals, turbine exit pressure signals, and far-field pressure signals, a tabulation component that tabulates a slope of a linear curve fit over a predetermined frequency range based on the calculated plurality of the cross-spectrum functions, and a computation component that computes the post-combustion residence time in the gas-turbine engine.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIGS. 3A, 3B-9A, 9B are graphical illustrations of a magnitude squared aligned coherence (MSC) function in part (a) and a cross-spectrum phase angle in part (b) in accordance with an aspect of the innovation.

FIGS. 10A, 10B-16A, 16B are graphical illustrations of a magnitude squared aligned coherence (MSC) function in part (a) and a cross-spectrum phase angle in part (b) in accordance with an aspect of the innovation.

DETAILED DESCRIPTION

Figure 1:
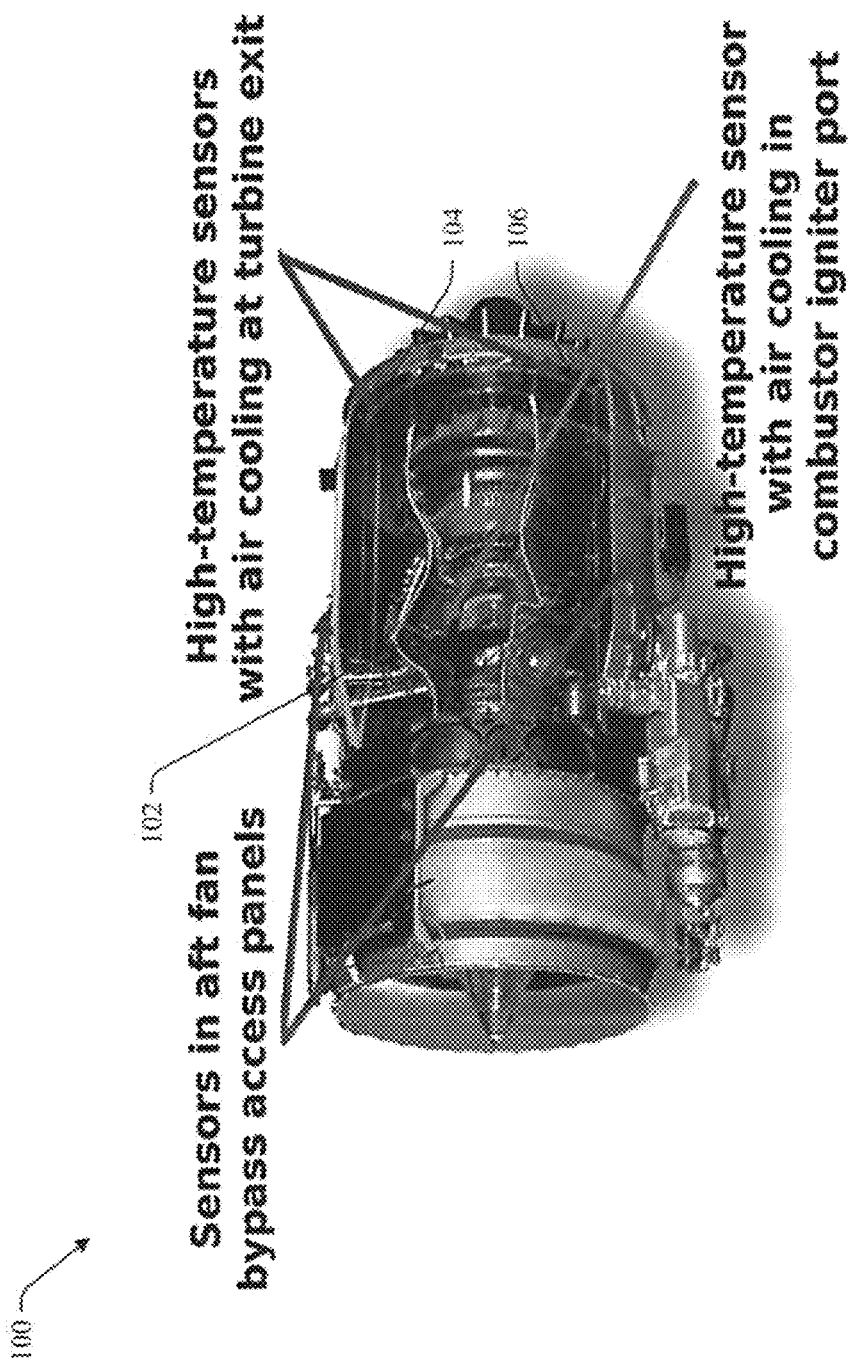
FIG. 1 is a perspective view of an example gas-turbine engine with instrumentation that can be utilized to measure post-combustion residence time in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Reducing $NO_x$ emissions and aircraft fuel burn by more than 75% while achieving perceived cumulative noise levels 71 dB below stage 4 limits in subsonic vehicles is a future goal of the aerospace industry. Over the years studies have been conducted on gas turbine (turbofan) engines to evaluate turbine tone generation, attenuation of direct combustion noise, etc. Indirect combustion noise, on the other hand, was initially thought to be a non-contributor to the engine core noise and, thus, was investigated only analytically and in model scale tests.

Low frequency noise generated in the turbofan engine core may make a significant contribution to the overall noise signature in the aft direction at the low power settings, which are used on an airport flight approach trajectory. This type of low frequency noise may be a problem for future aircraft. Two possible low frequency noise sources are "direct" and "indirect" combustion noise. The source of combustion noise attributed to the unsteady pressures produced by the unsteady combustion process that propagate through the turbine to the far field is called the "direct" combustion noise source. The other source of turbofan engine combustion noise is known as the "indirect" mechanism in which the noise is generated in the turbine by the interaction of entropy fluctuations, which also originate from the unsteady combustion process, as they propagate through regions characterized by mean flow velocity or pressure gradients in the turbine stages. In one embodiment, the innovation disclosed herein uses measured data from the indirect combustion noise in the combustor and the turbine exit to directly measure the post-combustion residence time.

The formation of thermal $NO_x$ depends on the stoichiometry, the residence time linearly, and on the reaction temperature exponentially. Zeldovich thermal $NO_x$ may be produced by oxidation of atmospheric nitrogen in the post flame gases. As turbine blade resistance to high temperatures improves, nitrogen production in the post-combustion zone may become more important. $NO_x$ levels increase with increasing post-combustion residence time. The characteristic combustor residence time can be defined as the ratio of the combustor volume to the bulk (volumetric) flow rate. This information, however, is proprietary, which limits the information available about the post combustion residence time in current and future combustor design concepts. Thus, the innovation discloses an alternate concept for determining the characteristic post-combustor residence time. The innovation determines the post-combustion residence time delay due to convection of entropy at the flow speed in the combustor. It is evaluated from the slope of the combustor sensor signal/turbine exit signal pressure cross-spectrum phase angle over an appropriate frequency range where the measured signal can be attributed to indirect combustion noise.

The net travel time of the indirect combustion noise signal from the combustor to the turbine exit and the far field increases since the travel velocity of the entropy fluctuations to the turbine is the flow velocity, which is a small fraction of the speed of sound, in the combustor. The innovation demonstrates that the pressure and entropy should be in phase in the combustor. As a result, the pressure signal from an indirect combustion noise source would be delayed relative to a pressure signal from a direct combustion noise source since an indirect combustion noise signal does not travel with the speed of an acoustic wave until it interacts with the turbine.

The innovation shows that the cross-spectra and correlation function between a combustor sensor and far-field microphones are tools that provide a way to separate "direct" and "indirect" coherent combustion noise due to this travel delay time. The innovation uses measurements in the combustor and turbine exit from a test engine to directly measure the post-combustion residence time. The innovation uses tools that are part of signal-processing theory to study a combustor pressure sensor signal and a turbine exit pressure sensor signal. The cross-spectral density phase measurement identifies a time delay that corresponds to the convective time delay. The magnitude of the coherence between the two sensors identifies the spectral region of importance as being in the 50-250 Hz frequency range. The innovation discloses the cross-spectral density phase angle and the coherence over a range of operating conditions and calculates the post-combustion residence time from the slope of the cross-spectral density phase angle.

Prior to disclosing the innovation, the information disclosed herein will be presented as follow: 1) First expressions for $NO_x$ emission; 2) First expressions for residence time; 3) Engine noise data; 4) A linear system theory; 5) A system model; 6) Results; and 7) The post-combustion residence time results calculated from the cross-spectrum between a combustor pressure sensor and a turbine exit pressure sensor are presented.

The operation of a gas turbine engine can be correlated with $NO_x$ emission levels using regression analysis of measurable test parameters or by consideration of time scales and chemical kinetics or using both sets of variables along with such variables as equivalence ratio, fuel flow rate and Mach number. A correlation of $NO_x$ emission levels determined by others for propane air combustion is based only on the residence time and adiabatic flame temperature. It was determined that the NO levels are principally a function of adiabatic flame temperature and combustor residence time, which is represented by the expression:

$$E_{NO_x} = t_{res} \exp\left\{-72.28 + 2.80\sqrt{T_{adiabatic}} - \frac{T_{adiabatic}}{38.02}\right\} \quad (1)$$

where $E_{NOx}$ is the $NO_x$ emission index (gNO$_2$/kg–fuel), $T_{adiabatic}$ is the adiabatic flame temperature (° K), and $t_{res}$ is the combustor residence time (ms). They found that over the range of pressures from 5 to 30 atmospheres, there is no significant observed departure from this expression for inlet temperatures 727K and higher.

Combustor residence time $\tau_{residence}$ is given by the bulk flow through the combustor volume expressed in equation (2):

$$\tau_{residence} = \frac{volume}{volumetric\,flowrate} = \frac{VP}{mRT} \quad (2)$$

Others have stated that that the residence time in a conventional combustor and in a micro-combustor is approximately 7 ms and 0.5 ms respectively.

The primary combustion zone residence time can also be calculated by equation (3):

$$\tau_{PZ} = \frac{V_{PZ}\rho_{combair}}{\dot{m}_{PZ}} \frac{T_{inlet}}{T_{AD,PZ}} \quad (3)$$

In examining a set of exemplified gas turbine dual fuel, dry low emission combustion system, primary zone residence times were found to be 2.71, 1.35, 8.17, 4.09, 9.84, and 4.92 ms.

Gas turbine $NO_x$ production, however, is more complicated than $NO_x$ emission from a propane combustor, described above, since in addition to the resident time dependence the reaction rate is assumed to be a function of pressure in addition to temperature or:

reaction rate=$p^m\exp(zT)$ (4)

and the mixing rates are assumed to be a function of linear pressure drop or:

mixing rate=$(\Delta P/P)x$ (5)

Consequently, $$E_{NO_x} = A\left(\frac{PV}{\dot{m}_A T}\right)\left(\frac{\Delta P}{P}\right)^x P^m \exp(zT) \quad (6)$$

$$= \frac{AV_c(\Delta P)^x P^{(1+m-x)}\exp(zT)}{\dot{m}_A T}$$

Others have correlated a large set of engine data using $A=9\times10^{-8}$, $x=0$, $m=0.25$, and $z=0.01$ so that:

$$E_{NO_x} = \frac{9.0\times 10^{-8} V_c P_3^{1.25}\exp(0.01T_{st})}{\dot{m}_A T_{pz}} \quad (7)$$

Still others recast equation (7), thereby making changes to improve correlation with data and derived:

$$E_{NO_x} = \frac{1.5 \times 10^{15}(\tau_{NO_x} - 0.5\tau_{ev})^{0.5}\exp(-71100/T_{St})}{P_3^{0.06}(\Delta P_3/P_3)^{0.5}} \quad (8)$$

where $\tau_{NO_x}$ is the residence time in the NOx production region, $\tau_{ev}$ is the evaporation time, $T_{St}$ is the reaction temperature, $P_3$ is the combustor inlet pressure, and $(\Delta P_3/P_3)$ is the combustor pressure drop.

Consequently, the primary zone residence time has evolved to become a $NO_x$ emission production parameter evaluated by doing a least squared curve fit to a large data set. The primary zone residence time formulation has become more complex as combustor design has become more complex. In part, this may be due to it not being a measurable quantity. When used as correlation factor it should be referred to as a primary zone $NO_x$ emission residence time and not as the primary zone residence time. As mentioned above, the innovation disclosed herein uses a procedure to measure the post-combustion residence time using signal processing methods. As a consequence, this post-combustion/post-flame residence time becomes available for consideration with knowledge of any engine company proprietary combustor geometry design information or proprietary operating parameters.

Figure 2:
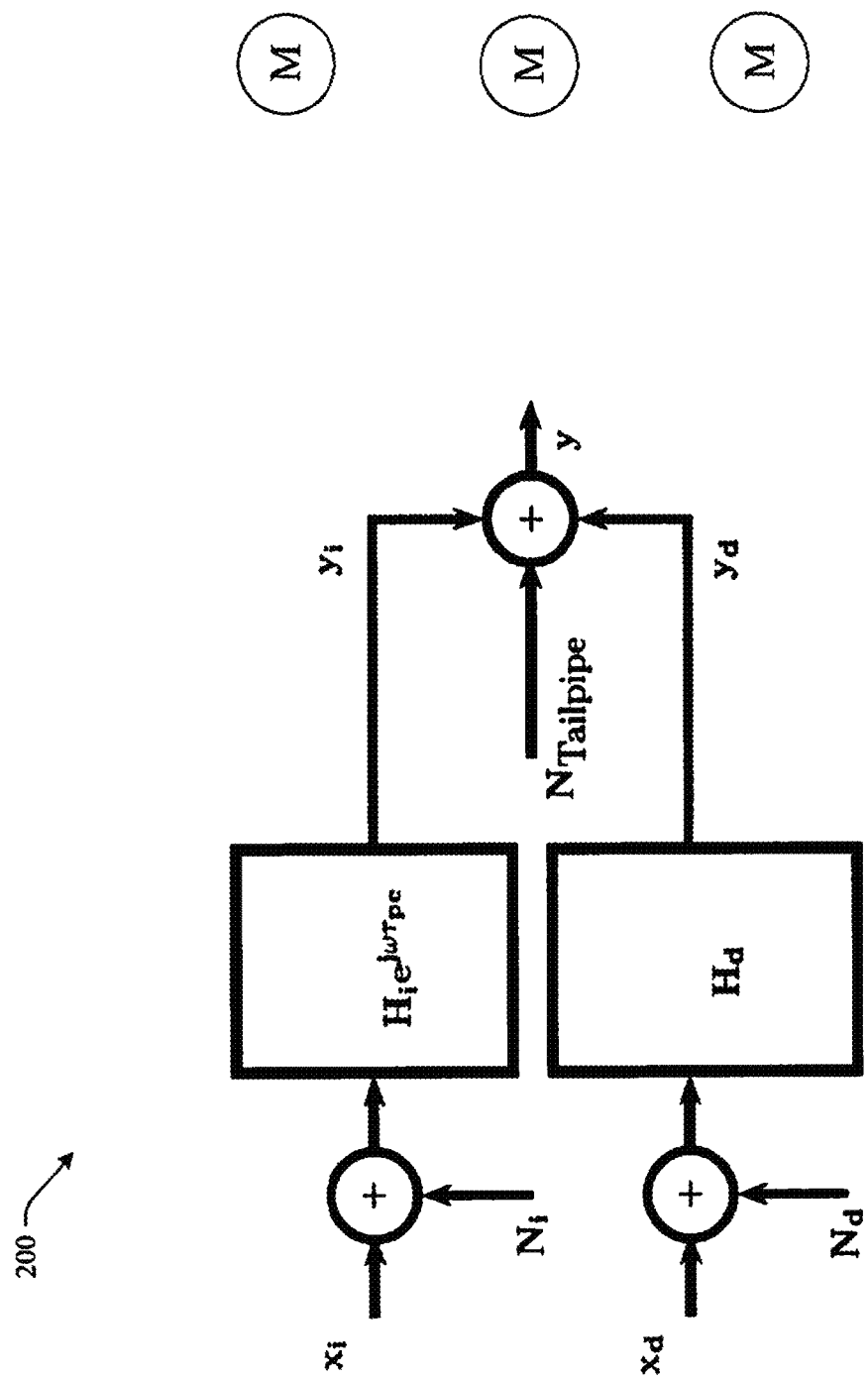
FIG. 2 is a schematic illustration of a turbine-combustor-tailpipe noise system diagram in accordance with an aspect of the innovation.

Referring now to the figures, FIG. 1 is an example engine 100 that can be utilized to conduct experiments to obtain engine test data and FIG. 2 illustrates a turbine-combustor-tailpipe noise system diagram 200 in accordance with an aspect of the innovation. The engine 100 is a dual-spool, turbofan engine that has a direct drive, a wide chord fan connected by a long shaft to a low-pressure turbine spool, and a high-pressure compressor connected by a concentric short shaft to a turbine high-pressure spool. The fan diameter is approximately 34.2 in. The combustor design is a straight-through-flow annular geometry with 16 fuel nozzles and 2 igniters.

The engine-internal instrumentation in this configuration includes a high-temperature pressure sensor with air cooling in a combustor igniter port 102 (hereinafter "combustor sensor"), a first 104 high-temperature pressure sensor with air cooling at a first turbine exit (hereinafter "first turbine exit sensor") and a second 106 high-temperature pressure sensor with air cooling at a second turbine exit (hereinafter "second turbine exit sensor").

The data acquisition system had a sampling rate of 65 536 Hz and a sampling duration of approximately 70 s. The spectra were calculated using a 50 percent overlap, which permitted data reduction using approximately 254 overlapped ensemble averages at a bandwidth resolution of 2 Hz. Signal estimation parameters are shown in Table 1 below.

TABLE 1

Spectral estimate parameters

| Parameter | Value |
| --- | --- |
| Segment length, (data points per segment), N | 32 768 |
| Sample rate, $r_s$, samples/s | 65 536 |
| Segment length, $T_d = N/r_s$, s | 0.500 |
| Sampling interval, $\Delta t = 1/r_s$, s | 1/65 536 |
| Bandwidth resolution, $B_e = \Delta f = 1/T_d = r_s/N$, Hz | 2.0 |
| Upper frequency limits, $f_c = 1/2\Delta t = r_s 2$, Hz | 32 768 |

TABLE 1-continued

Spectral estimate parameters

| Parameter | Value |
| --- | --- |
| Propagation time delay/lag (T = 9° C., τ = 30.48 m) $\tau_P = 5\ 927/65\ 536$, s | 0.09044 |
| Number of independent samples, $n_s$ | 128 |
| Overlap | 0.50 |
| Sample length $T_{total}$, s | ≈70 |

The spectra and cross-spectra are estimated using a non-parametric method, which is based on averaging multiple windowed periodograms using overlapping time sequences. Using these spectra and cross spectra, the magnitude squared coherence is calculated to measure the similarity of the amplitude variations at particular frequencies. The ^ accent will be used to denote the statistical basis of a variable. This is done to avoid confusion with calculations of coherence using a single segment or block which yield a coherence of unity. The concept used is based on determining the post-combustion residence time delay due to convection of entropy at the flow speed in the combustor. It is evaluated from the slope of the combustor sensor signal/turbine exit signal pressure cross-spectrum phase angle over an appropriate frequency range where the measured signal can be attributed to indirect combustion noise.

The appropriate frequency range is determined from the combustor sensor signal/turbine exit signal magnitude squared aligned coherence (MSC) function illustrated in equation (9) below.

$$\hat{\gamma}_{x,y}^2 = \frac{|\hat{G}_{x,y}|^2}{\hat{G}_{x,x}\hat{G}_{y,y}} \quad (9)$$

FIGS. 3-9 illustrate the MSC function in part (a) and the cross-spectrum phase angle in part (b) where the post-combustion residence time is at various percentages of maximum power as measured by the combustor sensor 102 and the first turbine exit sensor 104. Specifically, FIGS. 3-9 are at 48, 54, 60, 71, 87, 98, and 99 percent of maximum power respectively.

Further, FIGS. 10-16 illustrate the MSC function in part (a) and the cross-spectrum phase angle in part (b) where the post-combustion residence time is at various percentages of maximum power as measured by the combustor sensor 102 and the second turbine exit sensor 106. Specifically, FIGS. 10-16 are at 48, 54, 60, 71, 87, 98, and 99 percent of maximum power respectively.

Also illustrated in part (a) of FIGS. 3-16 is a coherence threshold calculated from:

$$\hat{\gamma}_{x_n x_n}^2(n_s) = 1 - (1-P)^{1/(n_s-1)} \quad (10)$$

where this formula determines a P-percent threshold confidence interval using the number of data segments/blocks, $n_s$, used in the periodogram method spectral estimator. The 95 percent confidence interval based on n=128 independent samples is 0.0233. The spectra are calculated using a 50 percent overlap and the 95 percent confidence interval based on n=273 samples is 0.0109. These indicators show the MSC function is reliable up to about 400 Hz. However, MSC function is above 0.1 only in a region from 30-250 Hz. The phase angle variation in this region is attributed to indirect combustion noise.

Instead of relying on the confidence interval given by Eq. (10), which is based on a statistical theory, to obtain a threshold value for $\hat{\gamma}_{nn}^2(n_s)$, a deliberately unaligned time history can be used to create the threshold value. If one of the time histories is shifted by a time delay more than the segment/block length, $Td=N/r_{sl}$, then the two time histories are totally independent unless tones are present. This deliberate de-correlation establishes a coherence threshold and also identifies any tones in the signals. Shifting the signals by this time delay removes the coherence of random noise but leaves the coherence of periodic functions which are sometimes identified as hidden periodicities, concealed spectral lines, or un-damped sinusoids in noise. The deliberately unaligned coherence is also shown in part (a) of FIGS. 3-9. Note that the higher statistical confidence interval based on the number of independent records ($n_d$=128) is a more conservative estimate of the measured coherence threshold. The statistical coherence threshold can be used with confidence since it can be compared with a measured coherence threshold. The coherence value is below the 95 percent statistical confidence interval above 400 Hz. Consequently, this is the upper frequency limit for which data is available for analysis using a linear system model.

The methods used herein are based on system theory developed for linear systems with random inputs. The linear system theory disclosed herein is in the frequency domain. The output spectral density function, G and the cross-spectra density function, G, is related to an input spectral density function, G through frequency response function, H, representing the turbine as $$\hat{G}_{y,y} = |H_{x,y}(f)|^2 \hat{G}_{x,x} \qquad (11)$$

and $$\hat{G}_{x,y} = H_{x,y}(f) \hat{G}_{x,x}. \qquad (11)$$

where x is the input signal from the high-temperature pressure sensor with air cooling in a combustor igniter port 102 and y is the output signal from either the first 104 or second 106 high-temperature pressure sensor with air cooling at the turbine exit.

The cross spectral density and the frequency response functions are complex valued quantities, which can be expressed in terms of a magnitude and an associated phase angle. This will be expressed herein using complex polar notation.

$$\hat{G}_{x,y}(f) = |\hat{G}_{x,y}(f)| \exp[-j\hat{\phi}(f)] \qquad (13)$$

$$H_{x,y}(f) = |\hat{H}_{x,y}(f)| \exp[-j\psi(f)] \qquad (14)$$

Before plotting the cross spectral density phase angle, phase unwrapping is applied to the phase angle to avoid a jump of $2\pi$ in the phase caused by the ATAN2 function.

The system under consideration has a combustion noise input with a measured spectrum, G, which includes acoustic and hydrodynamic components. The system measured output quantities are assumed to be related as follows:

$$\hat{G}_{9,10}^m(f) = H_{9,10}^m(f) \hat{G}_{9,9}^m(f) \qquad (15)$$

$$\hat{G}_{10,10}^m(f) = |H_{9,10}^m(f)|^2 \hat{G}_{9,9}^m(f) \qquad (16)$$

and the measured MSC by:

$$\hat{\gamma}_{9,10}^2 = \frac{|\hat{G}_{9,10}^m|^2}{\hat{G}_{9,9}^m \hat{G}_{10,10}^m} \qquad (17)$$

where m indicates noise may be included in the measured quantities. The unknown that will be identified is the turbine frequency response function, $H^m(f)$ at a range of operating conditions.

The system model disclosed herein is applied in the 50-250 Hz frequency range. The model involves the turbine attenuation and the convective time delay of the of the entropy signal. The plant being modeled is the turbine. The input to the plant is the total pressure signal and the measurement made in the combustor is of the total pressure signal. Consequently, the available input auto-spectrum is that of the total pressure signal. To aid in physical interpretation, a standard template parametric model form will be used. The model form disclosed herein is in a parametric reduced order frequency domain representation. The parameters depend nonlinearly on the operating point. However, at each operating condition the system will be assumed to be linear and the same parametric form will be used so that source separation will be obvious. The nonlinear operation is then described by a linear model at a range of observed operating points each identified by a set of parameters. As mentioned above, the innovation discloses measurements at the 48, 54, 60, 87, 98, and 99 percent maximum power settings. Over the frequency range 50-250 Hz, the turbine exit signal will be the result of an attenuation of the input signal by an amount K. At the turbine exit, the input signal will also have a time delay since the indirect combustion noise travels at the flow velocity t.

Consider an input signal x(t) with a spectrum $G_{xx}(f)$ for a system with transfer function $H_{x,y}(f)$ and output signal y(t). Then the cross spectrum is given by Equation (12). For the turbofan engine 100, the input to the turbine is the direct acoustic signal $x_d(t)$ and the time delayed entropy signal, $x_i(t)$, with a delay of $\tau_o$. The entropy signal may represent in addition to a temperature fluctuation moving with the flow any other disturbance moving with the flow such as a vorticity fluctuation.

Referring back to FIG. 2, as mentioned above, FIG. 2 illustrates a turbine-combustor-tailpipe noise system diagram 200 in accordance with an aspect of the innovation. The output turbine noise signals are $y_d(t)$ and $y_i(t)$. The output signal, y, is the sum of the direct combustion noise signal, $y_d$, and the indirect combustion noise signal, $y_i$:

$$y = y_d + y_i \qquad (18)$$

The direct combustion noise cross-spectral density, $G_{xdyd}$, is a product of the direct combustion noise turbine transfer function, $H_d(f)$, and the direct combustion noise input spectral density, $G_{xd}$.

$$G_{xdyd} = H_d(f) \cdot G_{xd} \qquad (19)$$

The indirect combustion noise cross-spectral density, $G_{xdyi}$, is a product of the indirect combustion noise turbine transfer function, $H_i(f)$, the time delay factor, $e^{-j2\pi f \tau 0}$, and the input indirect combustion noise spectral density, $G_{xi}$, which corresponds to an equivalent fluctuating entropy spectral density function.

$$G_{xdyi} = H_i(f) e^{-j2\pi f \tau o} \qquad (20)$$

The indirect combustion noise turbine transfer function, $H_i(f)$, is assumed to have a representation, $H(f)$. The direct combustion noise turbine transfer function, $H_d(f)$, is assumed to have a representation, α H(f). Where α is a measure of the direct combustion noise to the indirect combustion noise. Thus:

$$H_d(f)=\alpha H(f) \quad (21)$$

$$H_i(f)=H(f) \quad (22)$$

The direct combustion noise and the entropy noise have the same origin in the combustion process. Consequently it is assumed that the input direct combustion noise spectral density and the input entropy fluctuation spectral density have the same form.

$$G_{xd}=G_{xi} \quad (23)$$

Consequently, the measured cross-spectral density is given by:

$$G_{xdy}=G_{xdyd}+G_{xdyi}=H_d(f)G_{xd}+H_i(f)G_{xi}= H(f)(e^{-j2\pi f \tau_o}+\alpha)G_{xd}=H_s(f)G_{xd} \quad (24)$$

For the frequency range of 50-250 Hz, α is negligible and H(f)=K where $\log_{10}(K) \sim -10$. Consequently, the transfer function of the system is $$H_s(f)=Ke^{-j2\pi f \tau_o} \quad (25)$$

The combustor entropy noise, $N_i$, and combustor hydrodynamic noise, $N_d$, are assumed independent of each other and independent of the tailpipe noise, $N_T$. Thus:

$$G_{NiNd}=G_{NiNT}=G_{NdNT}=0 \quad (26)$$

A linear curve fit covering the frequency range from 50-250 Hz was made to the cross spectrum phase angle for the measurement made using the combustor sensor 102 and both the first and second turbine exit sensor 104, 106. Specifically, Table 2 illustrates the linear curve fit results based on the results from the combustor sensor 102 and the first turbine exit sensor 104. Table 3 illustrates the linear curve fit results based on the results from the combustor sensor 102 and the second turbine exit sensor 106.

TABLE 2

Linear Fit Values

| Percent Maximum Power | a ms | b Degrees | Correlation | Std. Dev. ms |
|---|---|---|---|---|
| 48 | 3.99 | −78.06782 | 0.985 | 0.0701 |
| 54 | 3.86 | −79.9248 | 0.982 | 0.0746 |
| 50 | 4.0229 | −90.7813 | 0.974 | 0.0942 |
| 71 | 3.7079 | −75.56375 | 0.97 | 0.093 |
| 87 | 3.4814 | −83.738 | 0.948 | 0.117 |
| 98 | 3.99 | −78.0678 | 0.985 | 0.07 |
| 94 | 3.3435 | −83.024 | 0.944 | 0.117 |

TABLE 3

Linear Fit Values

| Percent Maximum Power | a ms | b Degrees | Correlation | Std. Dev. ms |
|---|---|---|---|---|
| 48 | 4.024 | −77.3482 | 0.986 | 0.0687 |
| 54 | 4.079 | −84.048 | 0.985 | 0.071 |
| 60 | 4.0664 | −83.6347 | 0.986 | 0.0683 |
| 71 | 4.0188 | −90.96 | 0.966 | 0.108 |
| 87 | 3.5794 | −83.8152 | 0.961 | 0.104 |
| 98 | 3.5477 | −88.01 | 0.958 | 0.107 |
| 99 | 3.57 | 270.46 | 0.966 | 0.096 |

The post-combustion residence time, t, expressed in ms, is determined from the slope of the linear curve fit expressed in Equation (27) below:

$$P=t(360/1000)f-Q \quad (27)$$

or:

$$t=(P+Q)/(360/1000)f \quad (28)$$

where P is the phase angle in degrees, Q is the intercept in degrees, and f is the frequency.

Figure 17:
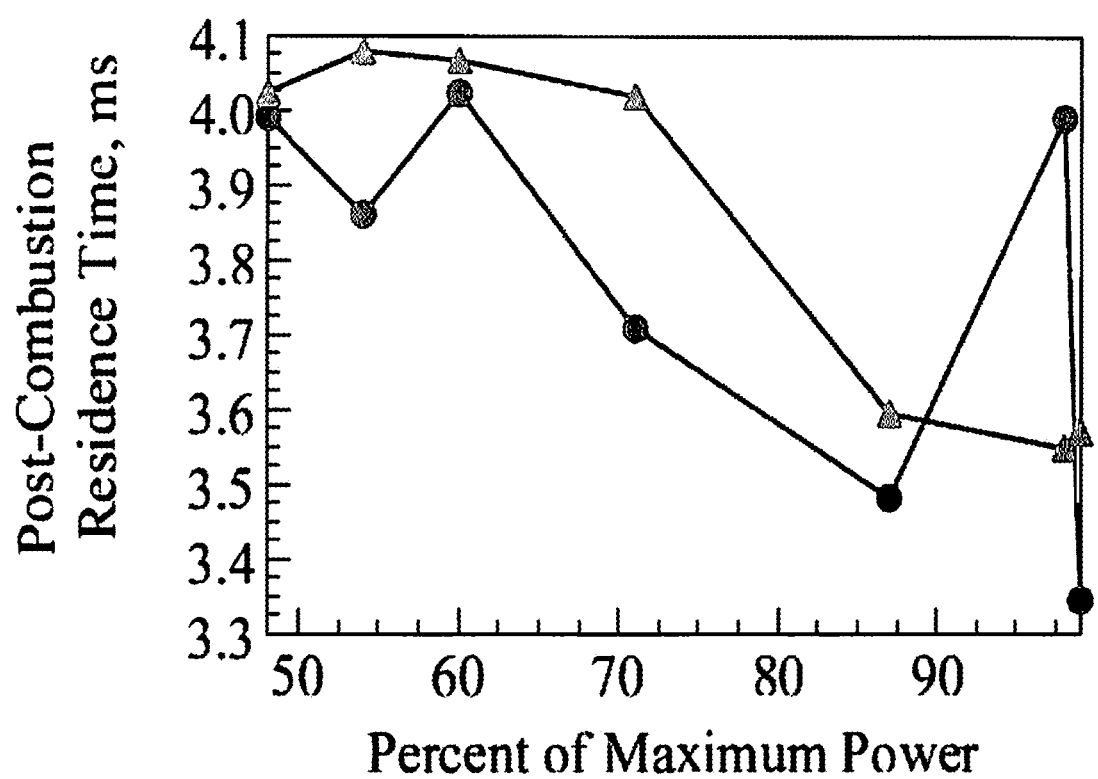
FIG. 17 is a graphical illustration of post-combustion residence times as a function of engine power in accordance with an aspect of the innovation.

The post-combustion residence times are graphically shown in FIG. 17 for each power setting and microphone pair. The graph represented by the circles is for the combustion sensor 102 and the first turbine exit sensor 104. Similarly, the graph represented by the triangles is for the combustion sensor 102 and the second turbine exit sensor 106. The post-combustion residence time was measured as a function of engine power. For the example turbofan engine shown in FIG. 1, the post-combustion residence time was approximately 4 ms at idle and 3.4 ms at a maximum power setting. As a result, the measurement of post-combustion residence time has implications for fuel usage and system fault detection.

The core noise components of the dual-spool turbofan engine were separated using coherence functions. A source location technique was used that adjusted the time delay between the combustor pressure sensor signal and the far-field microphone signal to maximize the coherence and remove as much variation of the phase angle with frequency as possible. For a 130° far-field microphone, a 90.03 ms time shift worked best for the frequency band from 0-200 Hz, while an 86.98 ms time shift worked best for the frequency band from 200-400 Hz. Hence, the 0-200 Hz band signal took more time than the 200-400 Hz band signal to travel the same distance. This suggests the 0-200 Hz coherent cross spectral density band is partly due to indirect combustion noise attributed to entropy fluctuations, which travel at a low flow velocity in the combustor until interactions with the turbine pressure gradient produce indirect combustion noise. The signal in the 200-400 Hz frequency band is attributed mostly to direct combustion noise. The method disclosed herein is successful because acoustic and temperature fluctuations are related by a linear transfer function that includes a convective time delay. This experiment involved the measurements of pressure and temperature disturbances in a long tube connected to a combustor. This linear connection of entropy and pressure fluctuations implies the direct and indirect combustion noises are correlated at the source.

Figure 18:
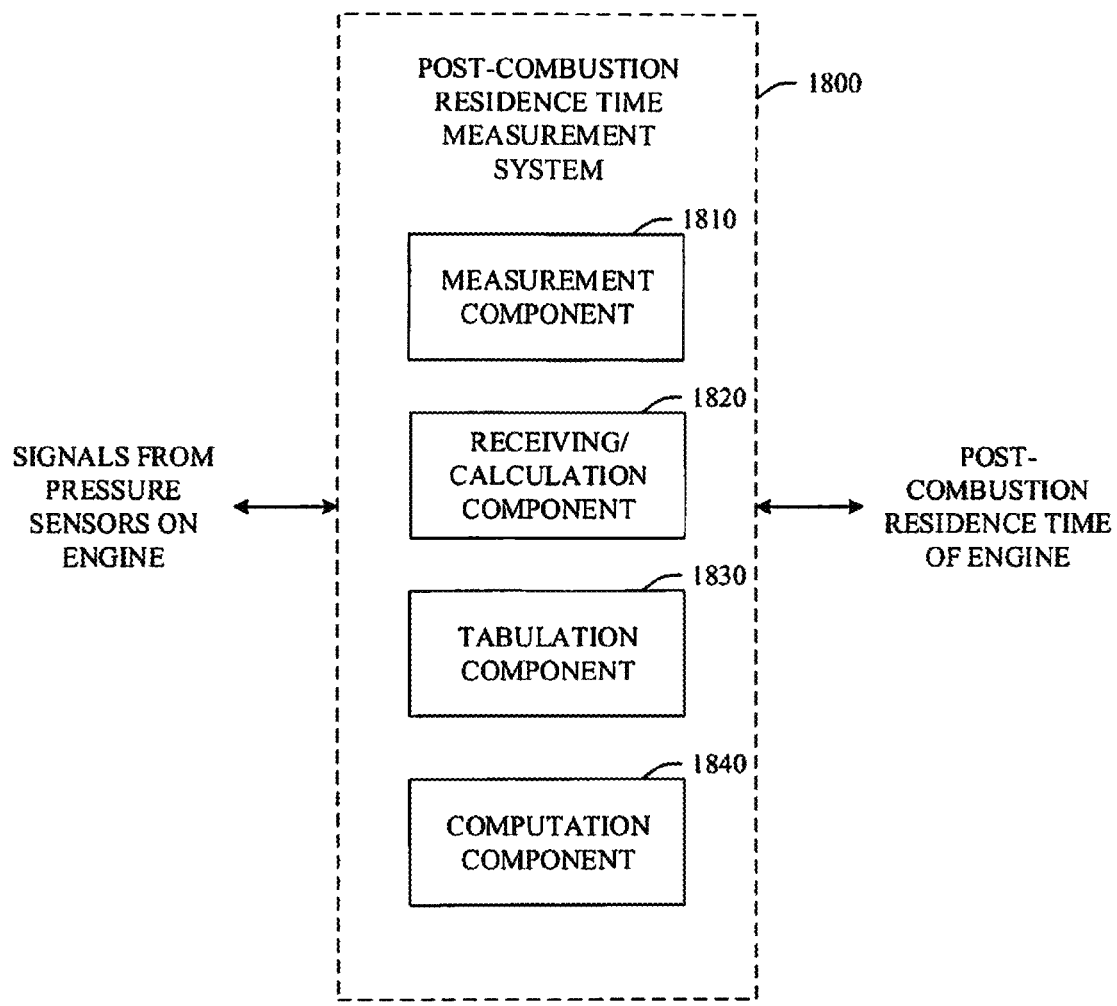
FIG. 18 illustrates an example system incorporating a method of measuring post-combustion residence time in a gas-turbine engine in accordance with an aspect of the innovation.
Figure 19:
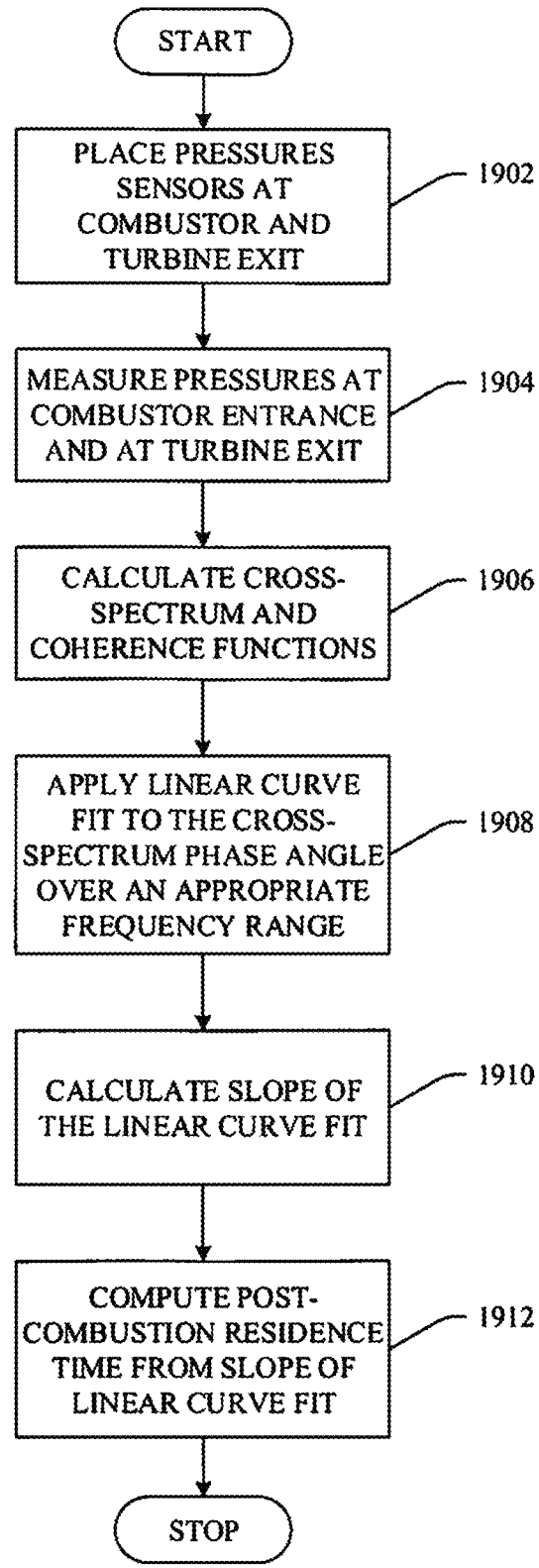
FIG. 19 illustrates an example flow chart of a procedure that measures post-combustion residence time in a gas-turbine engine in accordance with an aspect of the innovation.

Referring to FIGS. 18 and 19, a system 1800 and method 1900 of measuring the post-combustion residence time in a gas-turbine engine is described respectively in accordance with an aspect of the innovation. The system 1800 includes a measurement component 1810 comprised of the combustor sensor 102, the first and second turbine exit sensors 104, 106, and at least one far-field microphone M, a receiving/calculation component 1820, a tabulation component 1830, and a computation component 1840. The system 1800 processes information from the sensors described above to determine the post-combustion residence time in the gas-turbine engine, as will be subsequently described.

Specifically, at 1902, the combustor sensor 102 is placed at the combustor entrance, and the first and second turbine exit sensors 104, 106 are placed at the turbine exit, as described above in reference to FIG. 1. At 1904, the combustor sensor 102 measures the combustor pressure at the combustor entrance and the first and second turbine exit sensors 104, 106 measure turbine exit pressures at the turbine exit. At 1906, the cross-spectrum functions, specifically phase angle and coherence functions, are computed from the signals generated by the pressure sensors. Specifically, the receiving/calculation component 1810 receives the signals sent from the combustor sensor 102, and the first and second turbine exit sensors 104, 106. Upon receipt of the signals, the receiving/calculation component 1810 calculates the cross-spectrum and coherence functions. At 1908, a linear curve fit is made to the cross-spectrum phase angle over an appropriate frequency range as determined by the coherence function being greater than 0.1. Specifically, the tabulation component 1820 determines the linear curve fit and tabulates the linear curve fit results in a table, as illustrated in Tables 2 and 3 above. At 1910, the tabulation component further calculates a slope of the linear curve fit. At 1912, the computation component 1830 computes the post-combustion residence time, t, from the slope of the linear curve fit using the formula in Equation (28) above.

Figure 20:
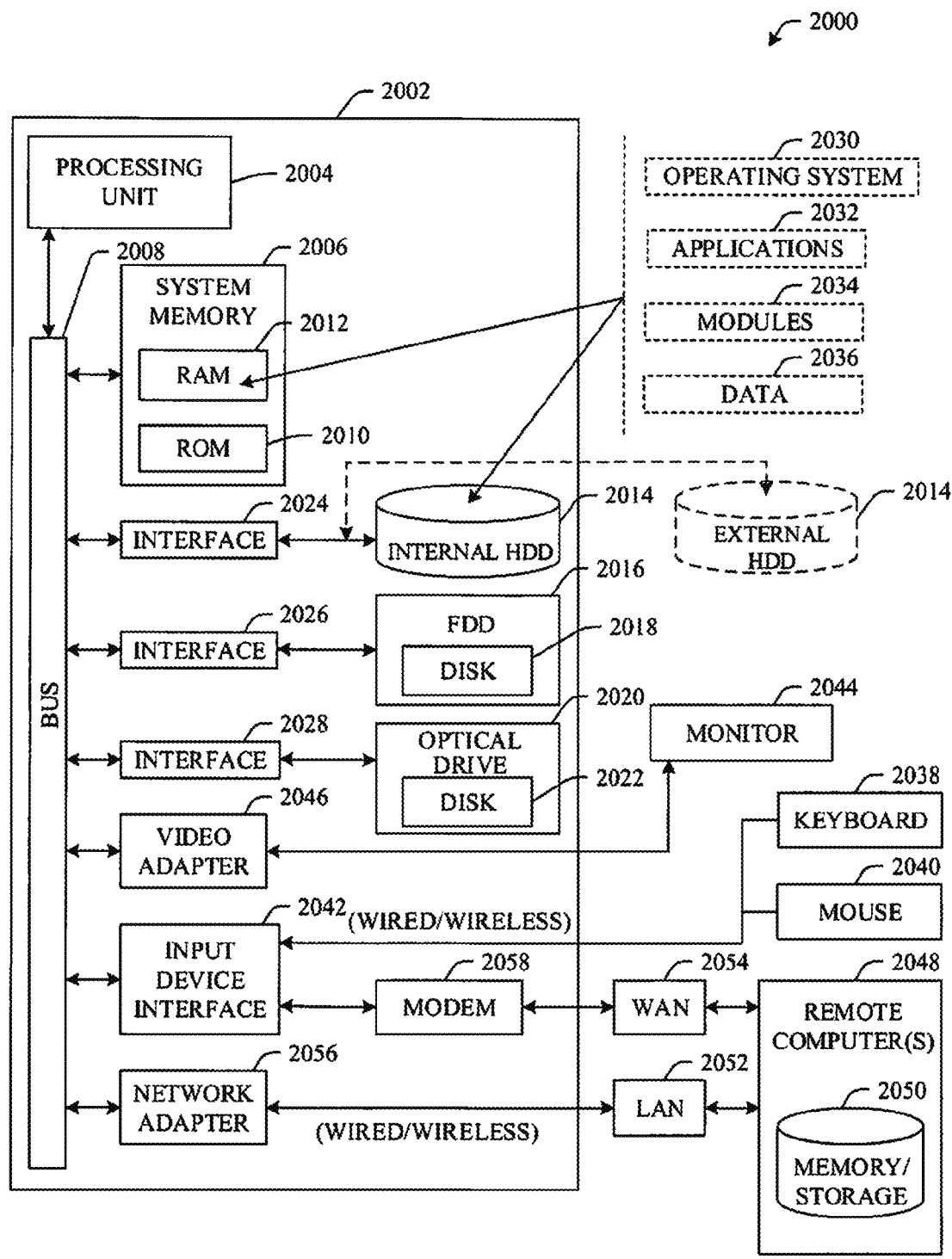
FIG. 20 illustrates a block diagram of a computer operable to execute the disclosed architecture.

Referring now to FIG. 20, a block diagram of a computer operable to execute the disclosed architecture is illustrated in accordance with an aspect of the innovation. In order to provide additional context for various aspects of the subject innovation, FIG. 20 and the following discussion are intended to provide a brief, general description of a suitable computing environment 2000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 20, the exemplary environment 2000 for implementing various aspects of the innovation includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures may also be employed as the processing unit 2004.

The system bus 2008 can be any of several types of bus structure that may further interconnect to a memory bus (with or without a memory controller), a peripheral bus, and a local bus using any of a variety of commercially available bus architectures. The system memory 2006 includes read-only memory (ROM) 2010 and random access memory (RAM) 2012. A basic input/output system (BIOS) is stored in a non-volatile memory 2010 such as ROM, EPROM, EEPROM, which BIOS contains the basic routines that help to transfer information between elements within the computer 2002, such as during start-up. The RAM 2012 can also include a high-speed RAM such as static RAM for caching data.

The computer 2002 further includes an internal hard disk drive (HDD) 2014 (e.g., EIDE, SATA), which internal hard disk drive 2014 may also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. It is appreciated that the innovation can be implemented with various commercially available operating systems or combinations of operating systems.

A user can enter commands and information into the computer 2002 through one or more wired/wireless input devices, e.g., a keyboard 2038 and a pointing device, such as a mouse 2040. Other input devices (not shown) may include a microphone, an IR remote control, a joystick, a game pad, a stylus pen, touch screen, or the like. These and other input devices are often connected to the processing unit 2004 through an input device interface 2042 that is coupled to the system bus 2008, but can be connected by other interfaces, such as a parallel port, an IEEE 1394 serial port, a game port, a USB port, an IR interface, etc.

A monitor 2044 or other type of display device is also connected to the system bus 2008 via an interface, such as a video adapter 2046. In addition to the monitor 2044, a computer typically includes other peripheral output devices (not shown), such as speakers, printers, etc.

The computer 2002 may operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which may connect to a global communications network, e.g., the Internet.

When used in a LAN networking environment, the computer 2002 is connected to the local network 2052 through a wired and/or wireless communication network interface or adapter 2056. The adapter 2056 may facilitate wired or wireless communication to the LAN 2052, which may also include a wireless access point disposed thereon for communicating with the wireless adapter 2056.

When used in a WAN networking environment, the computer 2002 can include a modem 2058, or is connected to a communications server on the WAN 2054, or has other means for establishing communications over the WAN 2054, such as by way of the Internet. The modem 2058, which can be internal or external and a wired or wireless device, is connected to the system bus 2008 via the serial port interface 2042. In a networked environment, program modules depicted relative to the computer 2002, or portions thereof, can be stored in the remote memory/storage device 2050. It will be appreciated that the network connections shown are exemplary and other means of establishing a communications link between the computers can be used.

The computer 2002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

To summarize the formation of $NO_x$ in gas-turbine combustors, $NO_x$ is formed in a distributed zone manner and that higher temperature-rise combustors will be required as turbine materials improve. While most correlation of $NO_x$ production equations apply in the primary zone, research has found equations for other zones. The innovation disclosed herein is based on a combustor/turbine system study and not on each component separately, which does not lead to these findings.

Others have indicated that using a constant thrust power setting a decrease in $NO_x$ emissions as a function of engine age is observable. This is attributed to an increase in mass flow due to hot section damage. It is suggested that turbine damage results in lower $NO_x$ emissions rate due to decreased residence time. Consequently, the post-combustion residence time measurement procedure disclosed herein may be utilized as a tool to detect turbine damage from aging or verify proper operation.

The typical fault diagnostic turbine system sensor system depends on measuring such items as fan exit pressure, LPC exit pressure, burner pressure, LPC exit temperature, HPC exit temperature, exhaust gas temperature, fuel flow, low spool speed, and high spool speed. None of these items convey the same information as the combustor residence time, which is a function of the turbine blade system operating condition and geometry. The available time to take corrective or compensatory actions such as repair or replace a part or reduce system operational loads to extend the life of the faulted part may be reduced with the additional information obtained from the innovation.

A gas turbine engine in a military or commercial aero-engine, or in industrial environment is a safety-critical system, which needs real-time fault detection and a decision support system to advise corrective actions so that the system can continue to function without jeopardizing the safety of personnel or damage to the equipment involved. Information on the status of the post-combustion residence time can provide additional information not available from any current sensor used in current fault detection systems.

Finally, in addition, jet fuel costs are 30 percent of an airlines cost. The status of post-combustion resident time as a function of time might provide information related to fuel usage.

In another example embodiment to determine the residence time in the engine 100 shown in FIG. 1, FIGS. 21-25B illustrate a cross-power spectrum phase-based adaptive method, which iteratively determines the post-combustion/post-flame residence in the combustor. The method develops an adaptive process that synchronizes two signals, a combustor signal and a turbine exit signal, correlated over a frequency range with a time domain iterative algorithm that removes a time delay between the two signals. The phase-based adaptive method is applied to data from the engine 100 using the combustor signal from the combustor sensor 102 and the turbine exit signal selected from either of the first or second turbine exit sensors 104, 106. The post-combustion residence time in the combustor is calculated by analyzing the indirect combustion noise, which contributes to the overall core noise, generated when a temperature disturbance moves through the turbine pressure field in the engine 100.

The algorithm uses a cost function and a gradient approximation to continually update the time delay estimate until the process has minimized the cost function. The cost function is based in part on a slope of a linear curve fit to an unwrapped phase of the cross-spectrum between the two signals over a frequency range of interest and also in part on the linear curve fit's standard deviation. The linear curve fit assumes the existence of a cross-spectrum phase offset and does not assume the linear fit has a zero intercept at $f=0$. The technique used is a steepest-descent gradient technique and thus, requires that the cost function is unimodal. The method disclosed herein estimates the post-combustion/post-flame residence time in the combustor and provides an estimate of the phase offset. In addition, the phase-based adaptive algorithm identifies a dominant low frequency coherent noise source at the turbine exit as either direct or indirect combustion noise.

As mentioned above, the indirect combustion noise contributes to the overall core noise of the engine 100. A simple mathematical model for the core noise measurement is given by:

$$r_k(t)=s_1(t)+n_1(t) \text{Combustor} \quad (29)$$

$$r_l(t)=s_2(t-D_{kl})+n_2(t) \text{Turbine Exit} \quad (30)$$

where an acoustic pressure signal $s_1(t)$ is assumed to be related to an entropy or temperature disturbance in the combustor, a pressure signal $s_2(t)$ at the turbine exit is assumed to be related to an indirect combustion noise source due to an entropy or temperature disturbance moving with the flow velocity through the turbine pressure field, and $n_1(t)$ and $n_2(t)$ are contaminating independent, Gaussian, and stationary noise terms, which are uncorrelated with $s_1(t)$ and $s_2(t)$. The cross-correlation function between the signals is given by:

$$R_{kl}(\tau)=E[r_k(t)r_l(t+\tau)]=R_{s_1s_2}(\tau-D_{kl}) \quad (31)$$

Where E is an effective value of E[ ], $R_{s_1s_2}(\tau-D_{kl})$ is the autocorrelation function with a peak at $\tau=D_{kl}$, $\tau$ is the time displacement, and $D_{kl}$ is the time delay, which is the post-combustion (post-flame) residence time in the combustor.

In the frequency domain, the Fourier transform of equation (31) is:

$$G_{kl}(f)=G_{s_1s_2}(f)\exp(-i2\pi f D_{kl}) \quad (32)$$

where $G_{s_1s_2}$ is the one-sided cross-spectrum and the time delay $D_{kl}$ appears in the cross-spectrum as a phase function:

$$\phi_{kl}(f)=2\pi f D_{kl}=\omega D_{kl} \quad (33)$$

here $\omega=2\pi f$. The magnitude-squared coherence (MSC) is defined by:

$$\gamma^2_{kl}(f)=|G_{kl}(f)|^2/[|G_{kk}(f)||G_{ll}(f)|] \quad (34)$$

All the spectra and cross-spectra are estimated using a nonparametric method, which is based on averaging multiple windowed periodograms using overlapping time sequences. Using these spectra and cross spectra, the magnitude squared coherence is calculated to measure the similarity of the amplitude variations at particular frequencies. In some sections, the prime symbol (') will be used to denote the statistical basis of a variable.

Considering the cross spectrum magnitude estimate, $G'_{kl}(f)$, and phase estimate, $\phi'_{kl}(f)$, computed from Fourier transforms of signals $r_1(t)$ and $r_2(t)$ calculated for a sample length total divided into $n_s$ independent samples. The estimated cross-spectrum $G'_{kl}$ is a complex number. The estimated cross-spectrum phase $\phi'_{kl}$ is given by:

$$\phi'_{kl}=\arctan[\mathcal{T}\,G'_{kl}/\mathcal{R}\,G'_{kl}] \quad (35)$$

where $\mathcal{T}$ is an imaginary part and $\mathcal{R}$ is a real part.

The cross spectrum magnitude estimates are statistically independent of each other and have a standard deviation approximately given by:

$$\sigma[|G'_{kl}(f_i)|]\approx|G_{kl}(f_i)|/(n_s\gamma^2_{kl}(f_i))^{1/2} \quad (36)$$

$$\sigma[\phi'_{kl}(f_i)]\approx\arcsin[(1-\gamma^2_{kl}(f_i))/(2n_s\gamma^2_{kl}(f_i))]^{1/2} \quad (37)$$

For small phase errors where $\sin \sigma=\sigma$:

$$\sigma[\phi'_{kl}(f_i)]\approx[(1-\gamma^2_{kl}(f_i))/(2n_s\gamma^2_{kl}(f_i))]^{1/2} \quad (38)$$

Figure 21:
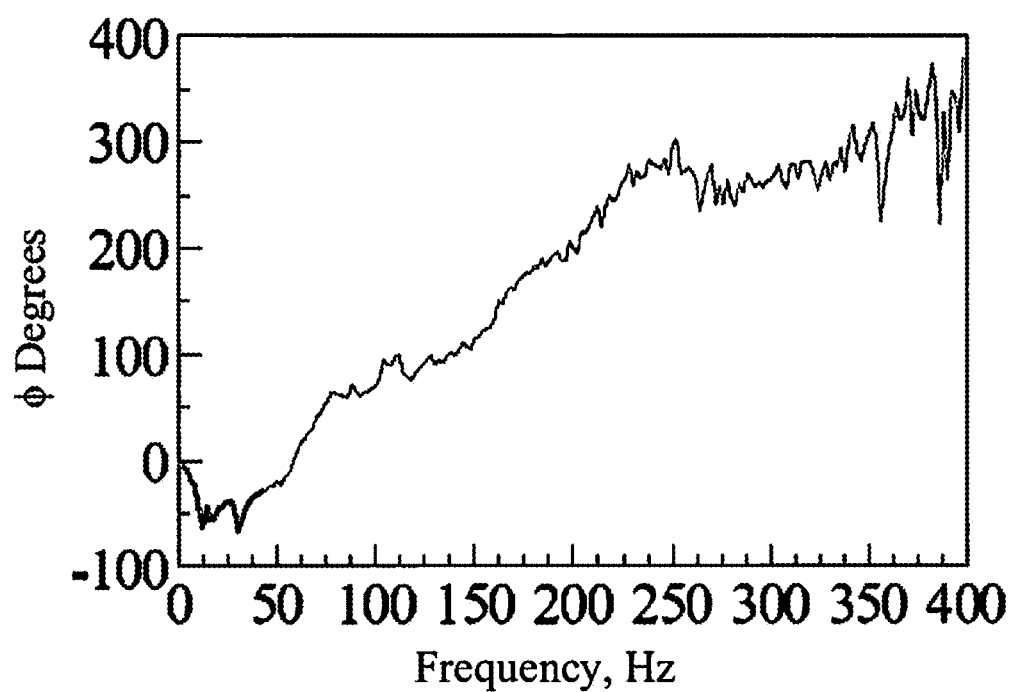
FIG. 21 is a cross-spectrum phase angle of a combustor sensor and a turbine exit sensor in accordance with an aspect of the innovation.

The proposed algorithm identifies the dominant noise source at the turbine exit as either direct or indirect combustion noise by calculating the time delay $D_{kl}$ between the combustor signal and the turbine exit signal. If the time delay $D_{kl}$ is acoustic the dominant noise source at the turbine exit is direct combustion noise. If the time delay $D_{kl}$ is the post combustion travel time in the combustor the source is the indirect combustion noise. The as measured pressure cross-spectrum phase between the combustor sensor and the turbine exit sensor shows the time delay as indicated by the slope of the phase plot, as shown in FIG. 21. The procedure used is to iteratively and optimally reset an origin of a time history curve of the turbine sensor signal and at each step calculate the pressure cross-spectrum phase between the combustor sensor 102 and one of the turbine exit sensors 104, 106 until the slope of the phase plot curve is zero. This optimal time delay is the true $D_{kl}$.

In order to estimate the time delay $D_{kl}$, a pattern matching function based on a linear regression line fit model to the measured cross-spectrum phase $\phi^m_{kl}$ is used as follows:

$$\phi'_{kl}(f)=\alpha+\delta_{kl}f+\epsilon \quad (39)$$

where $\alpha$ is the zero intercept, $\beta_{kl}$ is the slope, and $\epsilon$ is a residual value accounting for the discrepancy between the curved fit and the measured value due to random measurement error and the diffuse ambient coherent sound field.

The parameters are estimated using the least square method that minimizes the sum of squares of vertical distances are as follows:

$$S=\Sigma_i(\phi^m_{kl}(f_j)-\alpha-\beta_{kl}f_j)^2 \quad (40)$$

If $x_j=f_j$ and $y_j=\phi^m_{kl}(f_j)$ where the time delay is $D_{kl}=\beta_{kl}/(2\pi)$, then:

$$S_x = \sum_j x_j \tag{41}$$

$$S_y = \sum_j y_j \tag{42}$$

$$S_{xy} = \sum_j x_j y_j \tag{43}$$

$$\bar{x} = S_x/n_{kl} \tag{44}$$

$$\bar{y} = S_y/n_{kl} \tag{45}$$

$$S_{x^2} = \sum_j (x_j - \bar{x})^2 \tag{46}$$

$$S_{y^2} = \sum_j (y_j - \bar{y})^2 \tag{47}$$

$$\beta_{kl} = (S_{xy} - n_k \bar{x}\bar{y})/S_x^2 = \Sigma_j(y_j - \bar{y})(x_j - \bar{x})/S_x^2 \tag{48}$$

$$\alpha = \bar{y} - \beta_k \bar{x} \tag{49}$$

The residual variance is:

$$\sigma^2_{kl} = \Sigma_j(\phi'_{kl}(f_j) - \alpha - \beta_{kl}f_j)^2/(n_{kl}-2) \tag{50}$$

where the standard error measurement is $\sigma_{kl}$.

The cost function used to adjust the time delay $D_{kl}$ to minimize the slope of the linear curve fit to measurements of interest and reduce the standard error is:

$$C_o = (\beta_{kl} + \nu\sigma_k)^2 \tag{51}$$

The parameter $\nu$ is approximately $1.0\times10^{-4}$ so that a value of $\sigma_{kl}$ will not have an impact on the cost function until the slope $\beta_{kl}$ is reduced to $1.0\times10^{-3}$. A minimum and maximum cost functions are defined to prevent the search procedure from diverging and are as follows:

$$C_{max} = F_2(D_{kl} - D_{max})^2 \text{ if } D_{kl} > D_{max} \tag{52}$$

$$C_{min} = F_2(D_{min} - D_{kl})^2 \text{ if } D_{kl} < D_{min} \tag{53}$$

Thus, the total cost function, C, is:

$$C = C_o + C_{max} + C_{min} \tag{54}$$

The subroutine that calculates the cost function, time shifts the signal from the turbine $r_l$ an amount $n_{el}$ corresponding to the time delay $D_{kl}$.

$$r_l(j) = rl(j + n_{kl}) \tag{55}$$

where $n_{kl} = \text{Int}(r_s * D_{kl})$. This time shift resets the origin of the time history $r_l$. The cross-spectrum between the signals $r_k$ and $r_l$ is calculated. A new cost function is calculated and the iterative procedure continues until it converges to a final value of $D_{kl}$.

Figure 22:
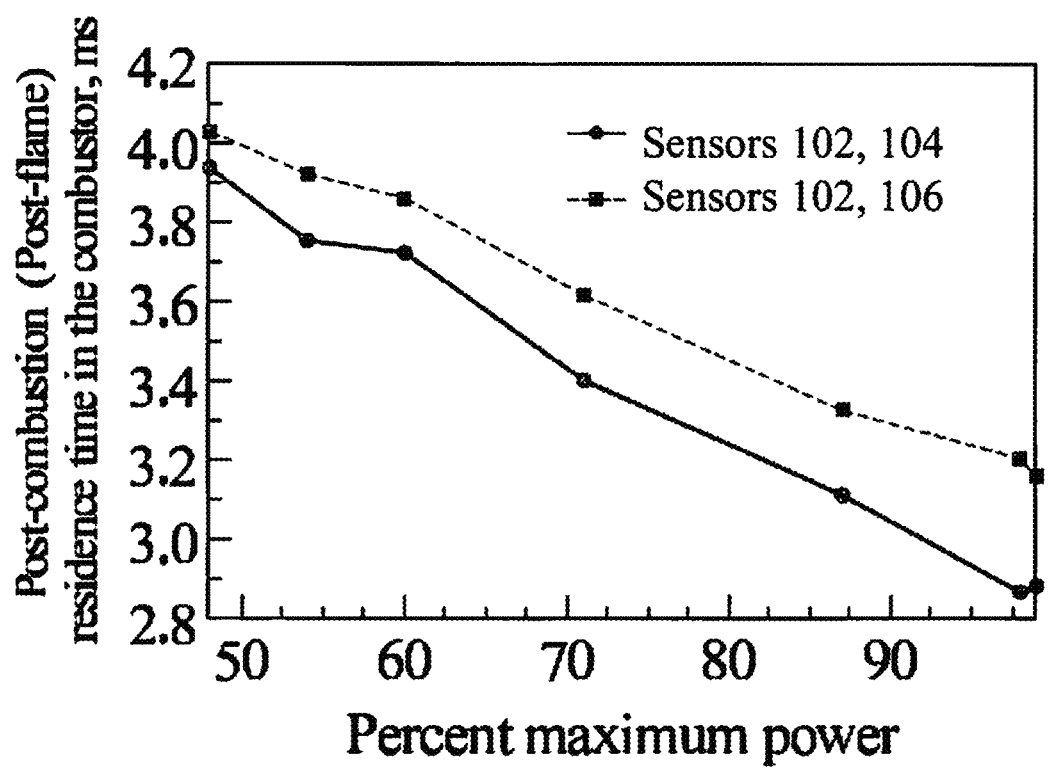
FIG. 22 is a plot illustrating the post-combustion residence time in a combustor at various percentages of maximum engine power in accordance with an aspect of the innovation.

Referring to FIG. 22 and to Table 4 below, post-combustion (post-flame) residence times $D_{kl}$ in the combustor was determined for 48, 54, 60, 71, and 87 percent of maximum power operating conditions and for two maximum power conditions, 98 and 99 percent. Two trials were performed at each power setting, one using sensors 102 and 104 and a second using sensors 102 and 106. As illustrated in FIG. 22 and Table 4, the post-combustion residence time decreases with engine power as the combustion flow increases with engine speed.

TABLE 4

| | Post-Combustion Residence Time | |
| --- | --- | --- |
| Percent Maximum Engine Speed | Sensors 102, 104 ms | Sensors 102, 106 ms |
| 48 | 3.936768 | 4.02832 |
| 54 | 3.757 | 3.922 |
| 60 | 3.723 | 3.860 |
| 71 | 3.403 | 3.616 |
| 87 | 3.113 | 3.326 |
| 98 | 2.869 | 3.204 |
| 99 | 2.884 | 3.159 |

Figure 23A:
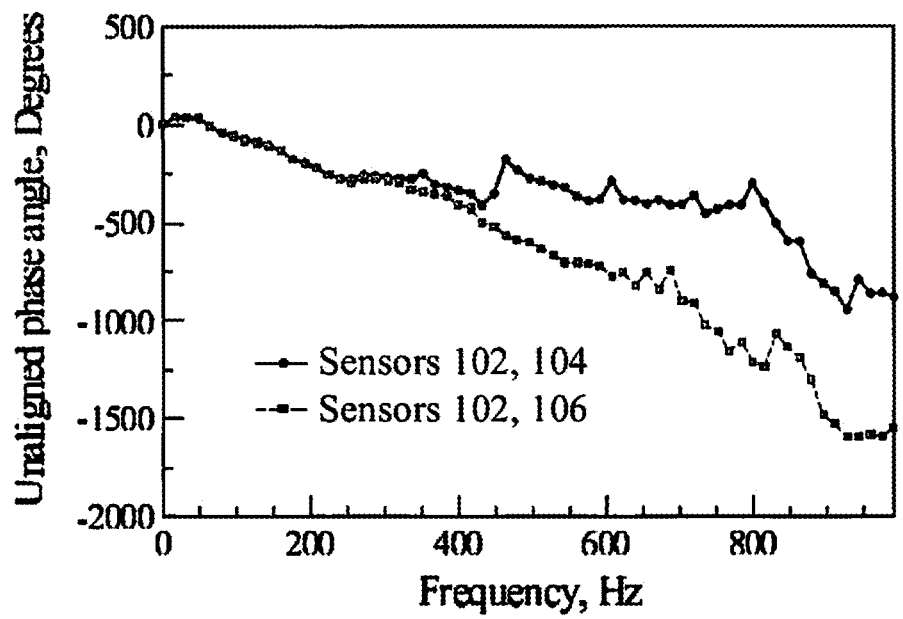
FIGS. 23A and 23B are un-aligned and aligned phase plots respectively illustrating post-combustion residence times in a combustor at 48 percent of maximum engine power in accordance with an aspect of the innovation.
Figure 23B:
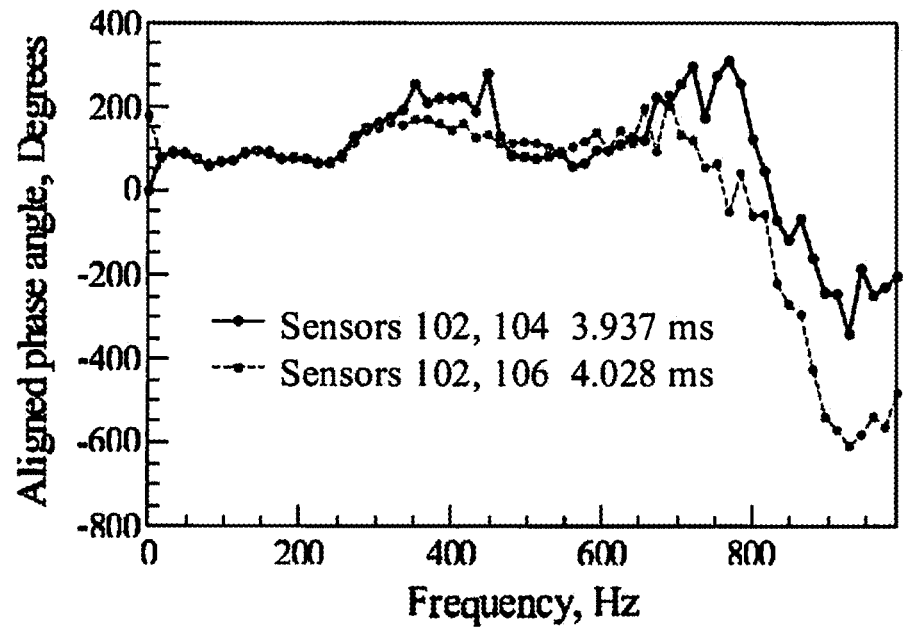

FIGS. 23A and 23B illustrate the unaligned and aligned cross-spectrum phase plots, respectively, between the combustor pressure sensor 102 and the turbine exit pressure sensors 104, 106. While the time delay investigation uses data from only 16 to 208 Hz, the two aligned phase angle plots are in agreement to a least 300 Hz. The aligned phase plot shown in FIG. 23B has a ripple that indicates the presence of an ambient core noise source, as the ripple is too regular to be due to random noise. Both sensors are subject to interference from an identical spatial correlation source at frequencies less than 200 Hz.

Figure 24A:
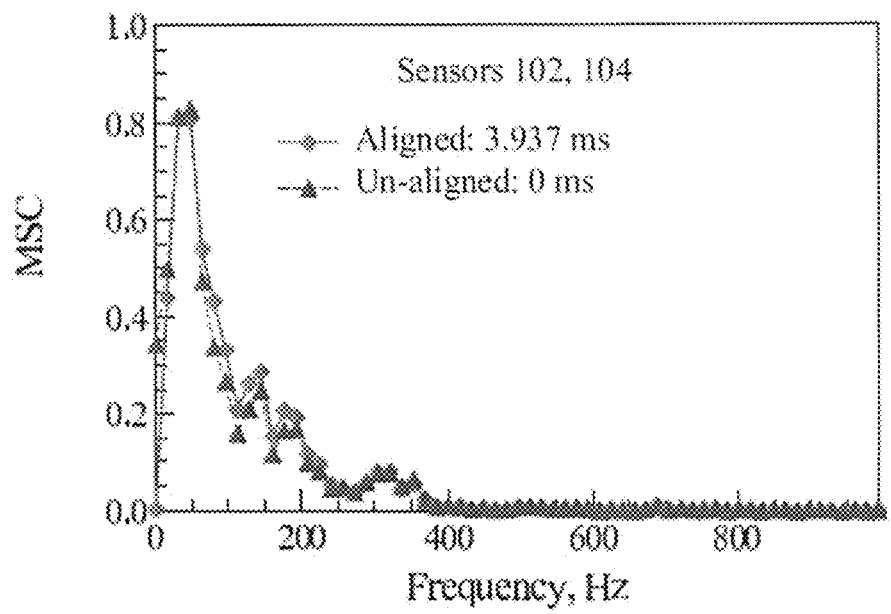
FIGS. 24A and 24B are Magnitude Squared Coherence plots illustrating post-combustion residence time plots in a combustor at 48 percent of maximum engine power using the same sensors in accordance with an aspect of the innovation.
Figure 24B:
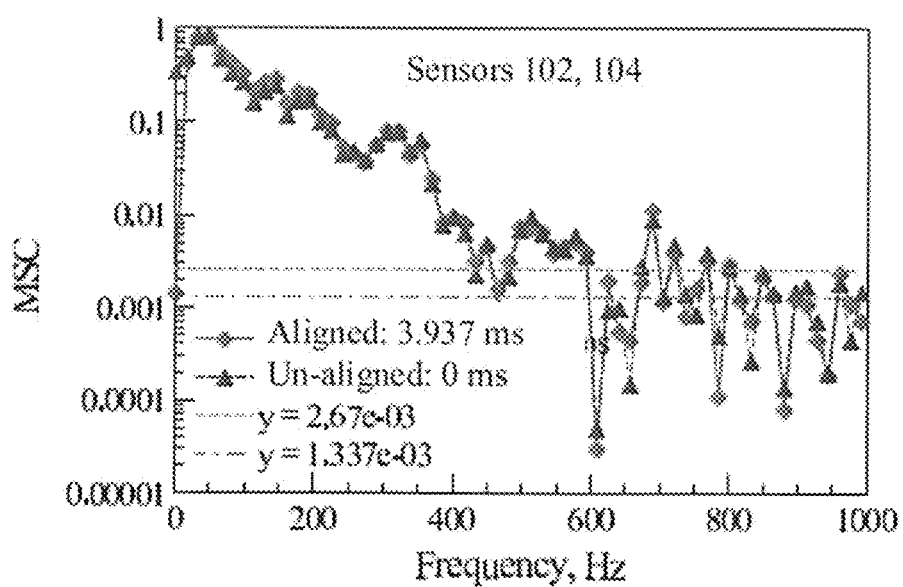

FIGS. 24A, B and 25A, B illustrate magnitude-squared coherence function (MSC) plots using both linear and logarithmic scales. Also illustrated FIGS. 24B and 25B are magnitude-squared coherence thresholds calculated from the equation:

$$(\gamma')^2_{x_n x_n}(n_s) = 1 - (1-P)^{1/(n_s-1)} \tag{56}$$

This formula determines a P-percent threshold confidence interval using a number of independent data segments/blocks $n_s$. For example, a 95 percent threshold confidence interval based on $n_s = 1120$ independent samples is $2.67\times10^{-3}$. However, the spectra are calculated using a 50 percent overlap to reduce the variance and the 95 percent threshold confidence interval based on $n_s = 2240$ samples is $1.337\times10^{-3}$. Both thresholds are illustrated in FIGS. 24B and 25B. These indicators illustrate that the MSC function is reliable up to approximately 400 Hz. However, MSC function is above 0.1 in a region from 16-208 Hz. The phase angle variation in this region is attributed to indirect combustion noise and an ambient core noise source.

Figure 25A:
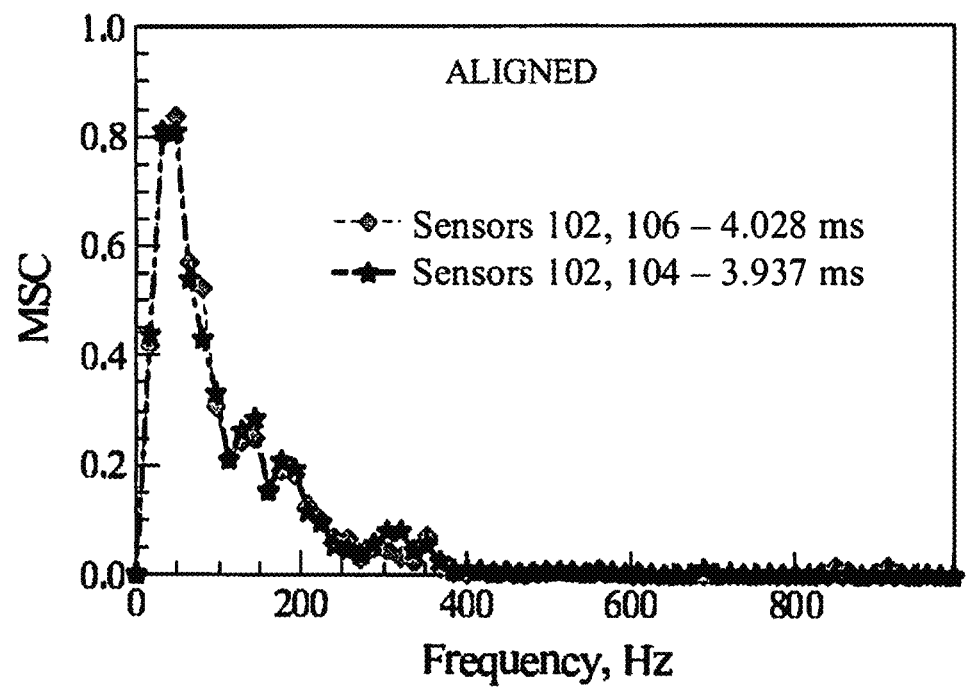
FIGS. 25A and 25B are Magnitude Squared Coherence plots illustrating post-combustion residence time plots in a combustor at 48 percent of maximum engine power using different sensors in accordance with an aspect of the innovation.
Figure 25B:
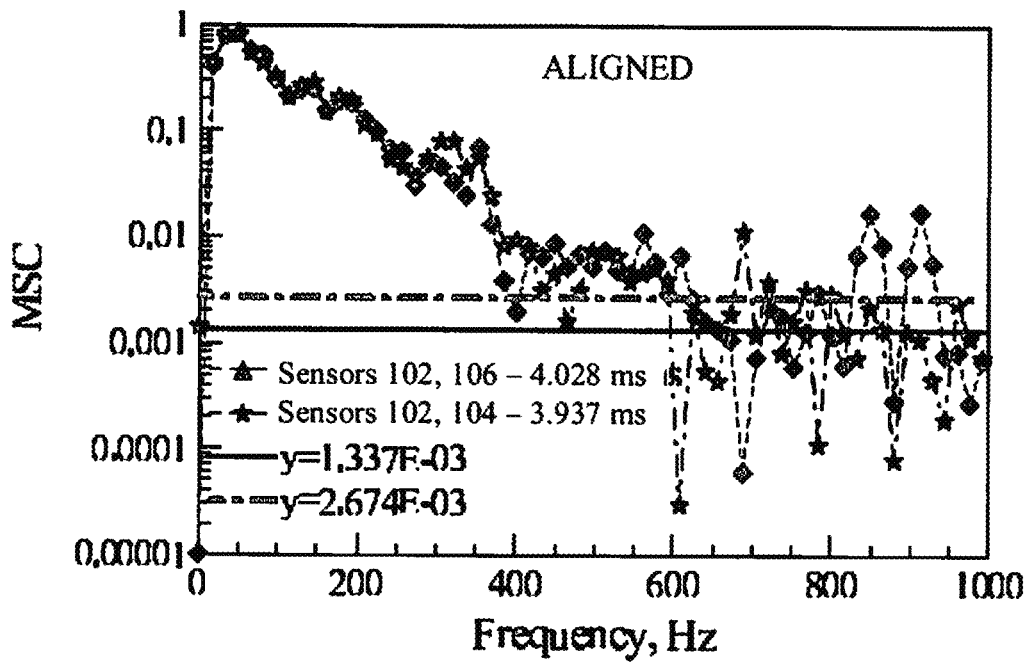

The aligned and unaligned coherence between the combustor sensor 102 and the turbine exit sensor 104 is shown in FIGS. 24A and 25B. The unaligned coherence is slightly smaller as expected. The aligned coherence in the frequency range of interest is well above the coherence threshold. Even though the data is overlapped by 50 percent, calculating the threshold using $n_s = 1120$ gives a result in better agreement with the unaligned data threshold.

The aligned coherence between the combustor sensor 102 and turbine exit sensor 104 and the aligned coherence between the combustor sensor 102 and turbine exit sensor 106 is shown in FIGS. 25A and 25 B. The two coherence functions are in good agreement from 16 to 208 Hz. The algorithm identifies the dominant low frequency coherent noise source below 200 Hz at the turbine exit as indirect combustion noise for the data from the engine 100.

The pattern matching approach described above in this example embodiment uses the slope of a linear curve fit that does not have a zero intercept at $f=0$ to effectively estimate the post-combustion (post-flame) time delay in the combustor. The strategy uses a sampling interval whereby the delay estimate is an integral multiple of the interval.

Factors used to predict combustion noise using analytical models by others include turbine geometry, turbine pressure, velocity and temperature fields, percent temperature fluctuations rms in percent of mean, axial length and tangential length scale of temperature fluctuations, RPM of blade rows, and pattern factor. These factors are not related to the factor used to detect indirect combustion noise, which is the post-combustion residence time in the combustor. The separation of indirect and direct combustion noise is important since direct combustion noise can be reduced by sound absorption material which adds weight. While indirect combustion noise can be reduced by sound absorption material, it can also be reduced by changes in combustor design or modifications in the combustor operation, which may change the factors used to predict indirect combustion noise and may reduce indirect combustion noise with no or little weight penalty.

The method disclosed herein illustrates a cross-power spectrum phase-based adaptive method, which iteratively determines the post-combustion/post-flame residence in the combustor. The method develops an adaptive process that synchronizes two signals, a combustor signal and a turbine exit signal, correlated over a frequency range with a time domain iterative algorithm that removes a time delay between the two signals. The procedure estimates the post-combustion/post-flame residence time in the combustor. It is the presence of indirect combustion noise that makes the procedure feasible. The number of independent averages is chosen to be large (e.g., $n_s \approx 1120$) and the magnitude-squared coherence (MSC) ranges from 0.1 to 208 Hz, which in turn makes the standard deviation of the cross-spectra phase small below 200 Hz. An algorithm for calculating the post-combustion (post-flame) residence time in the combustor is also be important in the understanding of the formation of thermal NOx in the combustor and verifying new and innovative combustor designs based on computational tools. Calculating the aligned MSC is a step that applies processing methods to the MSC data set. In general, the adaptive estimation technique developed herein is an effective tool to determine time delays between broadband coherent signals in noisy environments such as those that exist in real aircraft engines.

In another example embodiment, a modification to the example method illustrated in FIGS. 21-25B is disclosed and illustrated in FIGS. 26A-30B. This embodiment also utilizes the cross-power spectrum phase-based adaptive method including the time domain iterative algorithm described above to determine the residence time in the engine 100 shown in FIG. 1. In this embodiment, however, the phase-based adaptive method is applied to data from the engine 100 not only using the combustor signal from the combustor sensor 102 and the turbine exit signal selected from either the first or second turbine exit sensors 104, 106 but, also to far-field pressure signals captured by far-field microphones M.

The far field microphones M receive noise from the turbofan, jet and core. The method disclosed herein characterizes the core noise as indirect combustor noise and turbine-exit coherent broadband noise. In addition, the method estimates a propagation time from the source to the far-field microphone M. A simple mathematical model for the propagation time measurement is given by:

$$r_k(t)=s_1(t-D_{km})+n_1(t) \text{Combustor Sensor} \quad (57)$$

$$r_l(t)=s_2(t-D_{lm})+n_2(t) \text{Turbine Sensor} \quad (58)$$

$$r_m(t)=s_3(t)+n_3(t) \text{Microphones} \quad (59)$$

where the signal from the combustion pressure sensor 102 (station k) is delayed by the propagation time delay $D_{km}$, the turbine pressure signal from either the first or second turbine exit pressure sensor 104, 106 (station l) is delayed by the propagation time delay $D_{lm}$, and the signal is from the far-field microphone M (station m).

The signal from the combustor and the acoustic pressure signal $s_1(t)$ are related to an entropy or temperature disturbance. This disturbance moves at the combustor flow velocity to the turbine where it interacts with the pressure field creating indirect combustion noise which reaches the far-field microphone M after a total travel time $D_{km}$. The acoustic pressure signal $s_2(t)$ is from the turbine exit coherent broadband noise which reaches the microphone M after a total travel time $D_{lm}$. In either case the procedure to finding the time delay is identical and is described in the algorithm section. The signals from the sensors and the microphone M are contaminated by independent, Gaussian, and stationary noise terms, $n_1(t)$, $n_2(t)$, and $n_3(t)$, which are uncorrelated with $s_1(t)$, $s_2(t)$, and $s_3(t)$ and each other.

The cross-correlation function between the combustor signal and the signals from the far-field microphone M is given by:

$$R_{km}(\tau)=E[r_k(t)r_m(t+\tau)]=R_{s_1 s_3}(\tau-D_{km}) \quad (60)$$

where E is an effective value of E[ ], $R_{s_1 s_3}(\tau-D_{km})$ is the autocorrelation function with a peak at $\tau=D_{km}$, $\tau$ is the time displacement, and $D_{km}$ is the time delay, which is the post-combustion (post-flame) residence time in the combustor.

In the frequency domain, the Fourier transform of equation (60) is:

$$G_{km}(f)=G_{s_1 s_3}(f)\exp(-i2\pi f D_{km}) \quad (61)$$

where $G_{s_1 s_3}$ is the one-sided cross-spectrum and the time delay $D_{km}$ appears in the cross-spectrum as a phase function:

$$\phi_{km}(f)=2\pi f D_{km}=\omega D_{km} \quad (62)$$

where $\omega=2\pi f$. The magnitude-squared coherence (MSC) is defined by:

$$\gamma^2_{km}(f)=|G_{km}(f)|^2/[|G_{kk}(f)||G_{mm}(f)|] \quad (63)$$

The cross-correlation function between the combustor signal and the pressure signals from the far-field microphone M is given by:

$$R_{lm}(\tau)=E[r_l(t)r_m(t+\tau)]=R_{s_2 s_3}(\tau-D_{lm}) \quad (64)$$

where E is an effective value of E[ ], $R_{s_2 s_3}(\tau-D_{lm})$ is the auto correlation function with a peak at $\tau=D_{lm}$, $\tau$ is the time displacement, and $D_{lm}$ is the time delay, which is the post-combustion (post-flame) residence time in the combustor.

In the frequency domain, the Fourier transform of equation (64) is:

$$G_{lm}(f)=G_{s_2 s_3}(f)\exp(-i2\pi f D_{lm}) \quad (65)$$

where $G_{s2s3}$ is the one-sided cross-spectrum and the time delay $D_{lm}$ appears in the cross-spectrum as a phase function:

$$\phi_{lm}(f)=2\pi f D_{lm}=\omega D_{lm} \quad (66)$$

where $\omega=2\pi f$. The magnitude-squared coherence (MSC) is defined by:

$$\gamma^2_{lm}(f)=|G_{lm}(f)|^2[|G_{ll}(f)||G_{mm}(f)|] \quad (67)$$

Then $D_{kl}=D_{km}-D_{lm}$. With a small error since the acoustic propagation speed are high and the distances involved are small, the indirect combustion noise is dealt with as if it all begins propagating acoustically at the turbine exit and then it propagates to a microphone M in the same manner as the direct combustion noise.

All the spectra and cross-spectra are estimated using a nonparametric method, which is based on averaging multiple windowed periodograms using overlapping time sequences. Using these spectra and cross spectra, the magnitude squared coherence is calculated to measure the similarity of the amplitude variations at particular frequencies. In some sections, the prime symbol (') will be used to denote the statistical basis of a variable.

Considering the cross spectrum magnitude estimate, $G'_{km}(f)$, and phase estimate, $\phi_{km}(f)$, computed from Fourier transforms of signals $r_1(t)$ and $r_2(t)$ calculated for a sample length $T_{total}$ divided into $n_s$ independent samples. The estimated cross-spectrum $G'_{km}$ is a complex number. The estimated cross-spectrum phase $\phi'_{km}$ is given by:

$$\phi'_{km}=\arctan[\mathcal{T}\,G'_{km}/\mathcal{R}\,G'_{km}] \quad (68)$$

where $\mathcal{T}$ is an imaginary part and $\mathcal{R}$ is a real part.

The cross spectrum magnitude estimates are statistically independent of each other and have a standard deviation approximately given by:

$$\sigma[|G'_{km}(f_i)|]\approx|G_{km}(f_i)|/(n_s\gamma^2_{km}(f_i))^{1/2} \quad (69)$$

$$\sigma[\phi'_{km}(f_i)]\approx\arcsin[(1-\gamma^2_{km}(f_i))/(2n_s\gamma^2_{km}(f_i))]^{1/2} \quad (70)$$

For small phase errors where $\sin\sigma=\sigma$:

$$\sigma[\phi'_{km}(f_i)]\approx[(1-\gamma^2_{km}(f_i))/(2n_s\gamma^2_{km}(f_i))]^{1/2} \quad (71)$$

To a first order approximation the computed/estimated unaligned and aligned MSC based on the far-field microphones M and sensors in the combustor and at the turbine exit are related by:

$$(\gamma')^2_{km}(f)|\text{unaligned}\approx(1-D_{km}/T_d)2(\gamma)^2_{km}(f)|\text{aligned} \quad (72)$$

$$(\gamma')^2_{lm}(f)|\text{unaligned}\approx(1-D_{lm}/T_d)2(\gamma)^2_{lm}(f)|\text{aligned} \quad (73)$$

if $D_{km}$ and $D_{lm}$ are less than $T_d$.

To increase the number of blocks of data sampled to get better statistics the bandwidth resolution Be used is 16 Hz and the segment length Td of the signal is 62.5 ms. The time delay, however, from the engine sensors to the far field-microphone M $D_{km}$ and $D_{lm}$ is between 70 and 90 ms. Consequently, the alignment procedure must be used since using non-aligned measurements one would only measure the MSC threshold which is small. An order of magnitude estimate of the threshold for a 95 percent confidence interval and ns=1120 independent blocks of data is:

$$(\gamma')^2_{x_ny_n}(n_s)=1-(1-0.95)^{1/(ns-1)}=2.67\times10^{-3} \quad (74)$$

By aligning the measurements and removing any time delay the true MSC can be measured. The generalized unwrapped phase adaptive estimation procedure does need an initial condition for $D_{km}$ and $D_{lm}$. Using estimated values of 70 to 90 ms based on the acoustic speed of sound and the 100 ft microphone M radius is sufficient.

The algorithm identifies the dominant noise source at the turbine exit as either direct or indirect combustion noise over a certain frequency range. It does this by calculating the difference in delay time $D_{kl}$, for a signal from the combustor to reach the far-field microphone M and a signal from the turbine exit to reach the same far-field microphone M. If both time delays are about the same, the dominant noise source is direct combustion noise. If the time delay difference is approximately 3 to 4 ms, the dominant noise source is indirect combustion noise.

The noise from the turbine is acoustic while the noise in the combustor has a spectrum related to the noise created by entropy waves interacting with the pressure field in the turbine. This interaction produces noise after a time delay $D_{kl}$ related to the convection velocity in the combustor and the distance from the flame zone to the turbine. This post-combustion (post-flame) time delay $D_{kl}$ shows up in the phase of the cross-spectra of the combustion noise signal and a far-field microphone signal.

The procedure used is to first evaluate the time delay from the combustor and far-field microphone M cross spectrum $D_{km}$. This is done by iteratively and optimally resetting the origin of the time history of the far-field microphone signal and at each step calculating the pressure cross-spectrum phase between the combustor probe signal and the far field microphone signal until the slope of the phase plot curve is zero. This time delay is the acoustic travel time $D_{lm}$ plus the post-combustion (post-flame) time delay $D_{kl}$.

Next the same method is used to evaluate the time delay from the turbine exit probe signal and the same far-field microphone M, $D_{lm}$. Again this is done by iteratively and optimally resetting the origin of the time history of the far-field microphone signal and at each step calculating the pressure cross-spectrum phase between the turbine exit probe signal and the far field microphone signal until the slope of the phase plot curve is zero. This provides an estimate of the acoustic travel time from the turbine exit to the same microphone M, $D_{lm}$. Consequently, the difference in these actual time delays is the post-combustion (post-flame) time delay $D_{kl}$. The indirect combustion noise is treated as if it all begins propagating acoustically at the turbine exit and then it propagates to each microphone M in the same manner as the direct combustion noise.

In order to estimate either time delay $D_{kl}$ a pattern matching function based on a regression line fit to the measured cross-spectrum phase $\phi'_{kl}$ is used. The regression line fit, however, is not forced to have a zero intercept because: 1) the pressure sensors are not the same; 2) the pressure sensors are not phase matched; 3) the phase measured at $f=0$ will not be used in the time delay calculations, and 4) while a large number of independent samples are used and the MSC is greater than 0.01, the phase is calculated with uncertainty fluctuations. In addition, the MSC plots show the phase related to the indirect combustion noise is in the frequency range from 16-208 Hz.

A two parameter linear regression model is used to estimate the slope and will be described using the combustor sensor and the far-field microphone M.

$$\phi'_{km}(f)=\alpha+\beta_{km}f+\epsilon \quad (75)$$

The parameters are estimated using the least square method that minimizes the sum of squares of the vertical distances as follows:

$$S=\Sigma_i(\phi^m_{km}(f_j)-\alpha-\beta_{km}f_i)^2 \quad (76)$$

If $x_j=f_j$ and $y_j=\phi^m_{km}(f_j)$ where the time delay is $D_{km}=\beta_{km}/(2\pi)$, $a=\phi_0$, and $\epsilon$ is an error due to uncertainties, then:

$$S_x = \sum_j x_j \qquad (77)$$

$$S_y = \sum_j y_j \qquad (78)$$

$$S_{xy} = \sum_j x_j y_j \qquad (79)$$

$$\bar{x} = S_x/n_{kl} \qquad (80)$$

$$\bar{y} = S_y/n_{kl} \qquad (81)$$

$$S_{x^2} = \sum_j (x_j - \bar{x})^2 \qquad (82)$$

$$S_{y^2} = \sum_j (y_j - \bar{y})^2 \qquad (83)$$

$$\beta_{kl} = (S_{xy} - n_k \overline{xy})/S_x^2 = \Sigma_j(y_j - \bar{y})(x_j - \bar{x})/S_x^2 \qquad (84)$$

$$\alpha = \bar{y} - \beta_{kl}\bar{x} \qquad (85)$$

The residual variance is:

$$\sigma^2_{km} = \Sigma_j(\phi'_{km}(f_j) - \alpha - \beta_{km}f_j)^2/(n_{km} - 2) \qquad (86)$$

and the standard error measurement is $\sigma_{km}$.

The cost function used to adjust the time delay $D_{km}$ to minimize the slope of the linear curve fit to measurements of interest and reduce the standard error is:

$$C_o = (\beta_{km} + \nu\sigma_{km})^2 \qquad (87)$$

The parameter $\nu$ is approximately $1.0 \times 10^{-4}$ so that a value of $\sigma_{km}$ will not have an impact on the cost function until the slope $\beta_{kl}$ is reduced to $1.0 \times 10^{-3}$. A minimum and maximum cost functions are defined to prevent the search procedure from diverging and are as follows:

$$C_{max} = F_2(D_{km} - D_{max})^2 \text{ if } D_{km} > D_{max} \qquad (88)$$

$$C_{min} = F_2(D_{min} - D_{km})^2 \text{ if } D_{km} < D_{min} \qquad (89)$$

Thus, the total cost function, C, is:

$$C = C_o + C_{max} + C_{min} \qquad (90)$$

The search technique disclosed herein to find an optimal value of $D_{km}$ evaluates a new cost function with each iterative selection of $D_{km}$. The signal $r_k$ is measured at the combustor entrance at the same time as the signal $r_l$ is measured at the turbine exit and as each microphone signal $r_m$ is measured. The far-field microphone signal is delayed by the travel time from the combustor or turbine exit. The method aligns the combustor signal or turbine exit signal with the microphone signal by changing the origin of the time history of the combustor or turbine exit signal by an appropriate amount to deliberately shift it backward to match the proper time delay.

First considering the signal from the combustor sensor 102, the subroutine calculates the cost function time shifts the signal $r_k$ from the combustor by an amount $n_{km}$ as follows:

$$r'_k(j) = r_k(j + n_{km}) \qquad (91)$$

where $n_{km} = \text{Int}(r_s * D_{km})$.

For the turbine exit sensors 104, 106, the subroutine that calculates the cost function time shifts the signal from the sensor $r_l$ by an amount $n_{lm}$ as follows:

$$r'_l(j) = r_l(j + n_{lm}) \qquad (92)$$

where the cross-spectrum is being calculated using a turbine exit signal sensor 104, 106 and where $n_{lm} = \text{Int}(r_s \times D_{lm})$.

The actual value of $D_{lm}$ depends on the acoustic propagation velocity and distance along the paths from the turbine to the nozzle and from the nozzle through the jet at the nozzle exit and then to the microphone M on the ground. The actual value of $D_{km}$ depends on $D_{lm}$ and the velocity of the gas flow in the combustor and the distance in the combustor from the flame zone to the turbine. The cross-spectrum between the signals $r_k$ and $r_m$ or $r_l$ and $r_m$ is calculated. Next, a new cost function is calculated and the iterative procedure continues until it converges. The resulting phase plot of $\phi_{km|zero\ slope}$ over the frequency range from 16 Hz to 208 Hz where the MSC is less than or equal to 0.1 after convergence will show a set of points moving above and below a horizontal line in a random fashion due to uncertainties caused by noise where:

$$\phi_{km|zero\ slope} \approx \arctan\ [(\mathcal{T}\ G_{s1s3|zero\ slope}(f) \exp(-i\phi_{s1s3|zero\ slope}(f)))) \div (\mathcal{R}\ G_{s1s3|zero\ slope}(f) \exp(-i\phi_{s1s3|zero\ slope}(f))))] \qquad (93)$$

The post-combustion (post-flame) residence times in the combustor $D_{kl}$, as determined for the 48 and 54 percent of maximum power operating conditions is shown below in Tables 5 and 6 respectively. These tables show the propagation time for the turbine exit sensors 104, 106 is in the range of 86 to 94 ms and the indirect combustion noise signal takes 3.6 to 4.03 ms longer. Each table show the actual number of counts and time in ms required to shift the far-field pressure signal to make it align with the combustion sensor signal.

TABLE 5

Post-Combustion Residence Time
(48% Maximum Engine Power)

| Far-field Microphone at 100 ft | 102 counts | 104 counts | 106 counts | Δ 102 104 counts | Δ 102 106 counts | $D_{kl}^{104} \times 1000/2^{16}$ ms | $D_{kl}^{106} \times 1000/2^{16}$ ms |
|---|---|---|---|---|---|---|---|
| 90° | 6349 | 6099 | 6091 | 250 | 258 | 3.814697 | 3.936768 |
| 110° | 6098 | 5842 | 5836 | 256 | 262 | 3.906250 | 3.997803 |
| 130° | 5878 | 5619 | 5611 | 259 | 267 | 3.952026 | 4.074097 |

TABLE 5-continued

Post-Combustion Residence Time
(48% Maximum Engine Power)

| Far-field Microphone at 100 ft | 102 counts | 104 counts | 106 counts | Δ 102 104 counts | Δ 102 106 counts | $D_{kl}^{104} \times 1000/2^{16}$ ms | $D_{kl}^{106} \times 1000/2^{16}$ ms |
|---|---|---|---|---|---|---|---|
| 160° | 5689 | 5349 | 5345 | 260 | 264 | 3.967285 | 4.028320 |
| mean (τ) | 3.960 ms | | | | | | |
| standard deviation (τ) | 0.079 ms | | | | | | |

TABLE 6

Post-Combustion Residence Time
(54% Maximum Engine Power)

| Far-field Microphone at 100 ft | 102 counts | 104 counts | 106 counts | Δ 102 104 counts | Δ 102 106 counts | $D_{kl}^{104} \times 1000/2^{16}$ ms | $D_{kl}^{106} \times 1000/2^{16}$ ms |
|---|---|---|---|---|---|---|---|
| 90° | 6367 | 6131 | 6124 | 236 | 243 | 3.601074 | 3.707886 |
| 110° | 6112 | 5868 | 5859 | 244 | 253 | 3.723145 | 3.868474 |
| 130° | 5891 | 5640 | 5636 | 251 | 255 | 3.829956 | 3.890991 |
| 160° | 5620 | 5366 | 5368 | 254 | 252 | 3.875732 | 3.845215 |
| mean (τ) | 3.792 ms | | | | | | |
| standard deviation (τ) | 0.103 ms | | | | | | |

Figure 26A:
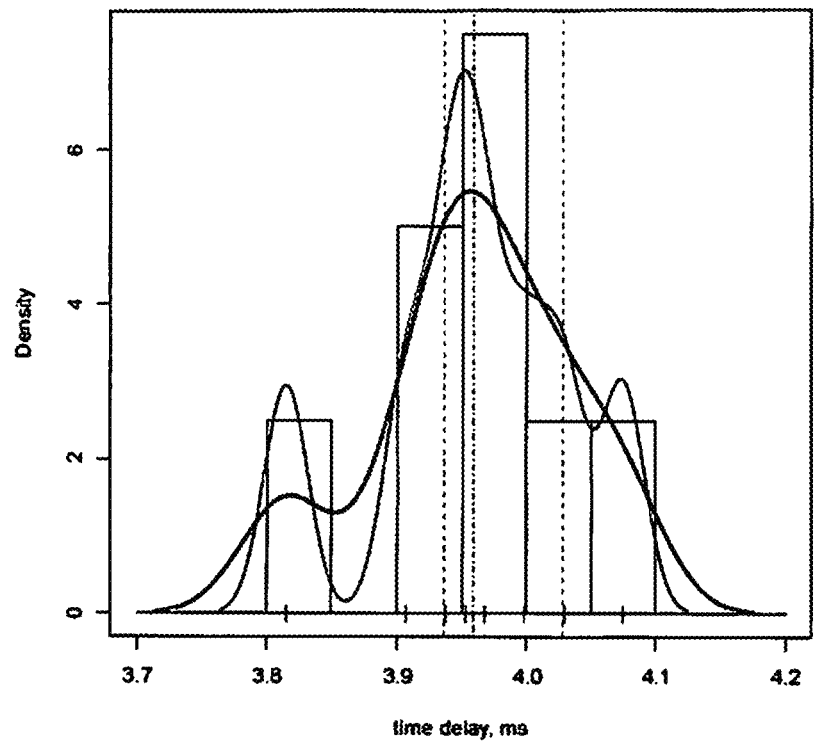
FIGS. 26A and 26B are histograms of post-combustion residence time plots in a combustor at 48 and 54 percent respectively of maximum engine power in accordance with an aspect of the innovation.

A histogram of the post combustion residence times in the combustor at 48 percent maximum power operating conditions is shown in FIG. 26A. Illustrated at the bottom of the plot are the location of the actual estimates as a scatter plot using a vertical bar | as the plotting symbol. The mean value ($\tau_{mean}$=3.960 ms) of the post-combustion time delay in the combustor is shown as the blue dashed line. The red dashed line illustrate values for the post combustion residence times using only the combustor sensor 102 and each of the first and second turbine exit sensors 104, 106, which are in close agreement with the values calculated using far-field microphones M.

Figure 26B:
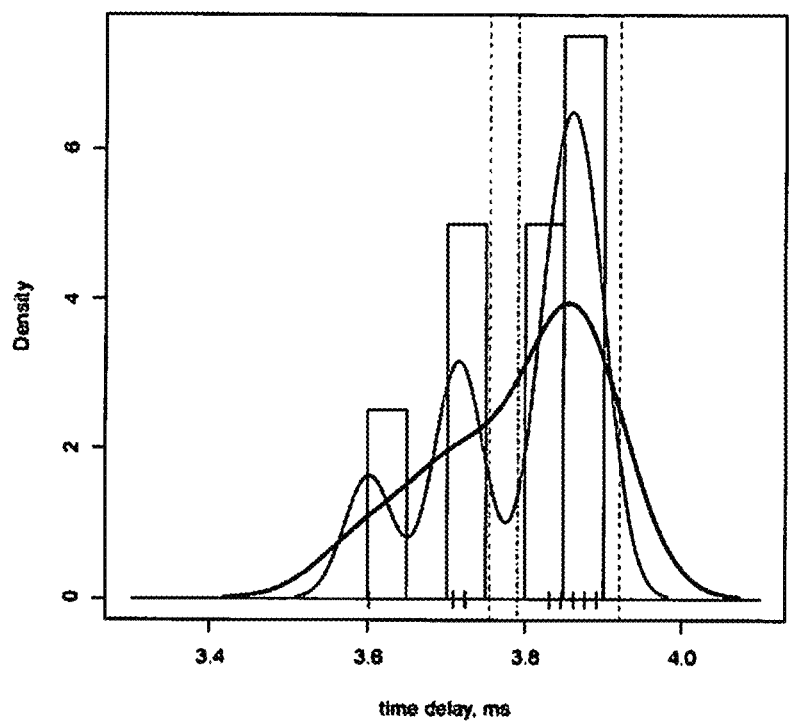

A histogram of the post combustion residence times in the combustor at the 54 percent maximum power case is shown in FIG. 26B. Illustrated at the bottom of the plot are the location of the actual estimates as a scatter plot using a vertical bar as the plotting symbol. The mean value ($\tau_{mean}$=3.791 ms) of the post-combustion time delay in the combustor is shown as the blue dashed line. The red dashed line illustrate values for the post combustion residence times using only the combustor sensor 102 and each of the first and second turbine exit sensors 104, 106, which are in close agreement with the values calculated using far-field microphones M.

Figure 27A:
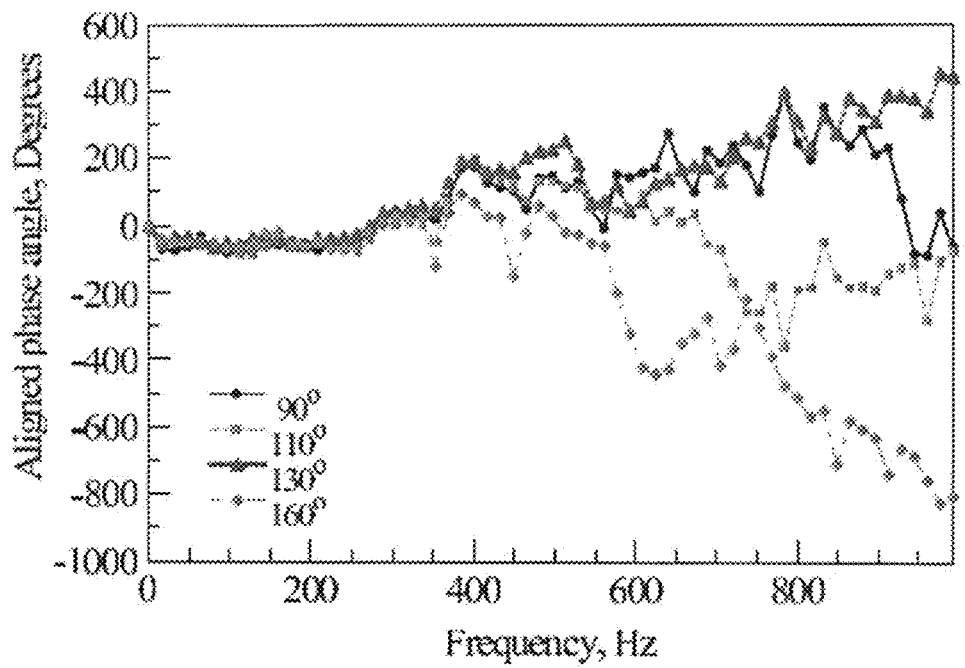
FIG. 27A is an aligned cross-spectra phase angle plot between a combustor sensor and a far-field microphone at 48 percent of maximum engine power in accordance with an aspect of the innovation.
Figure 27B:
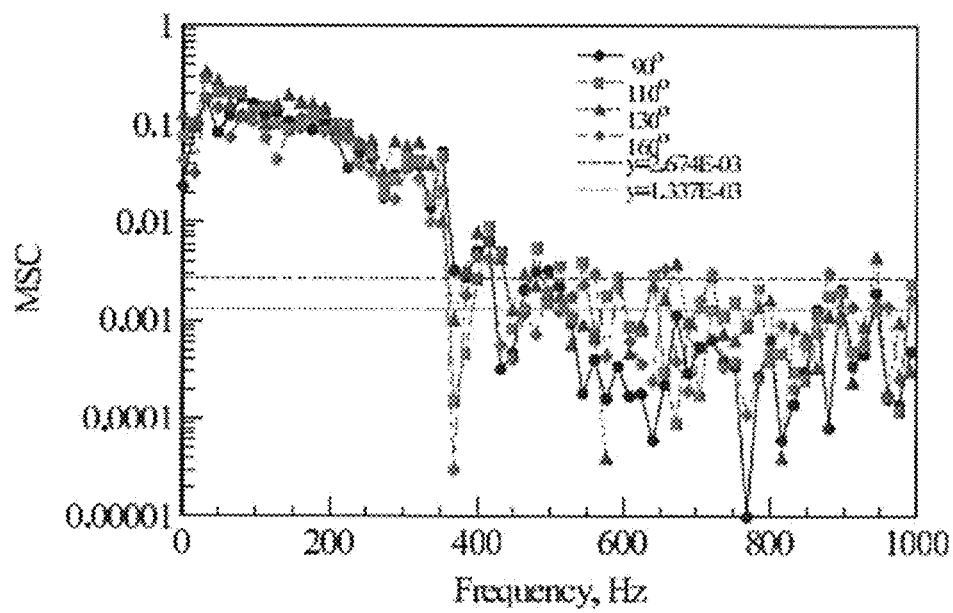
FIG. 27B is a coherence phase angle plot between the combustor sensor and the far-field microphone at 48 percent of maximum engine power in accordance with an aspect of the innovation.
Figure 28A:
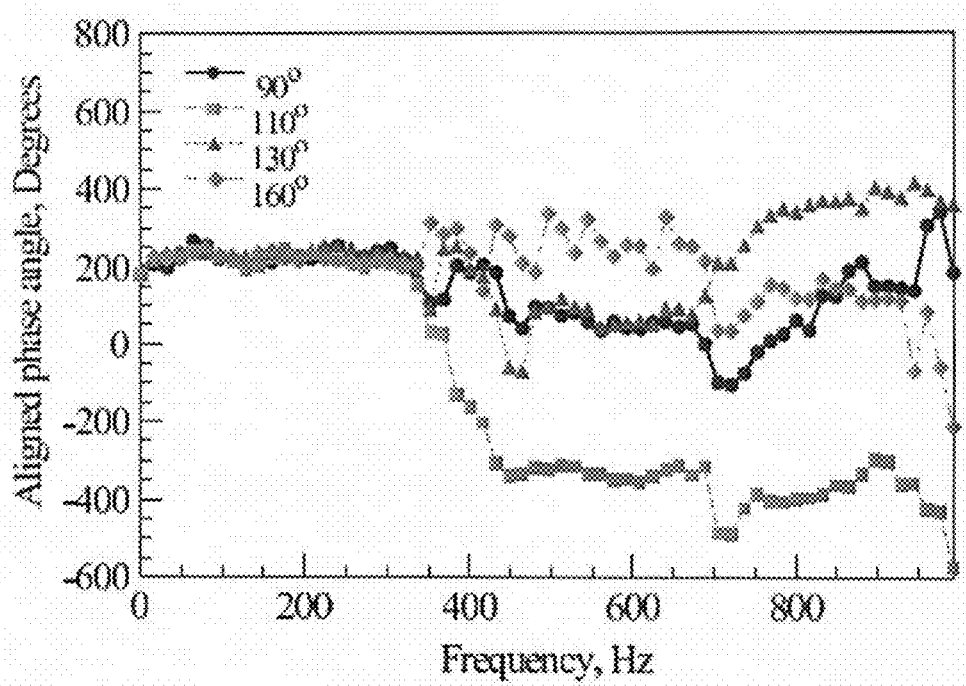
FIG. 28A is an aligned cross-spectra phase angle plot between a first turbine exit sensor and the far-field microphone at 48 percent of maximum engine power in accordance with an aspect of the innovation.
Figure 28B:
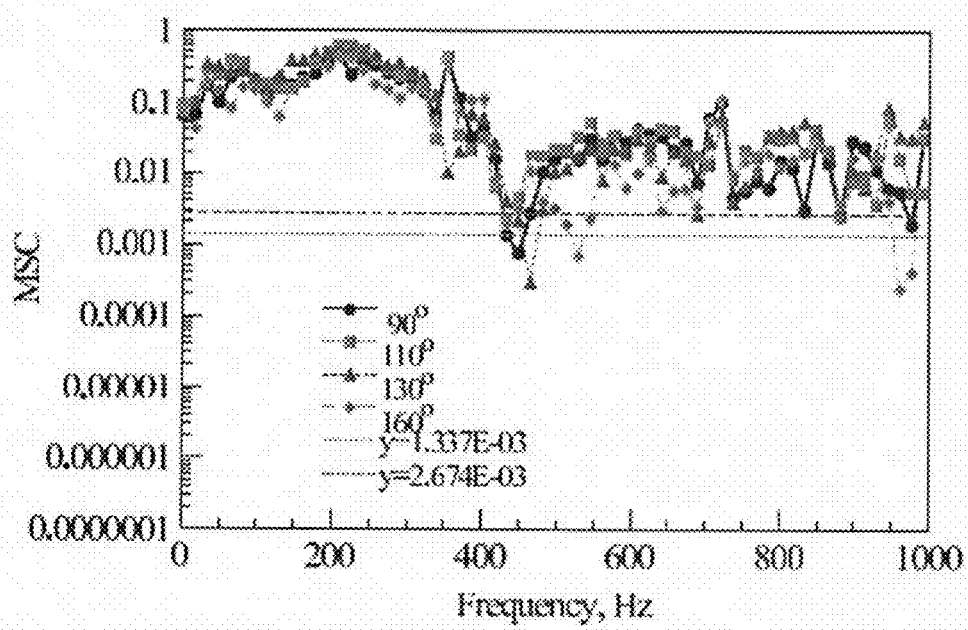
FIG. 28B is a coherence phase angle plot between the first turbine exit sensor and the far-field microphone at 48 percent of maximum engine power in accordance with an aspect of the innovation.
Figure 29A:
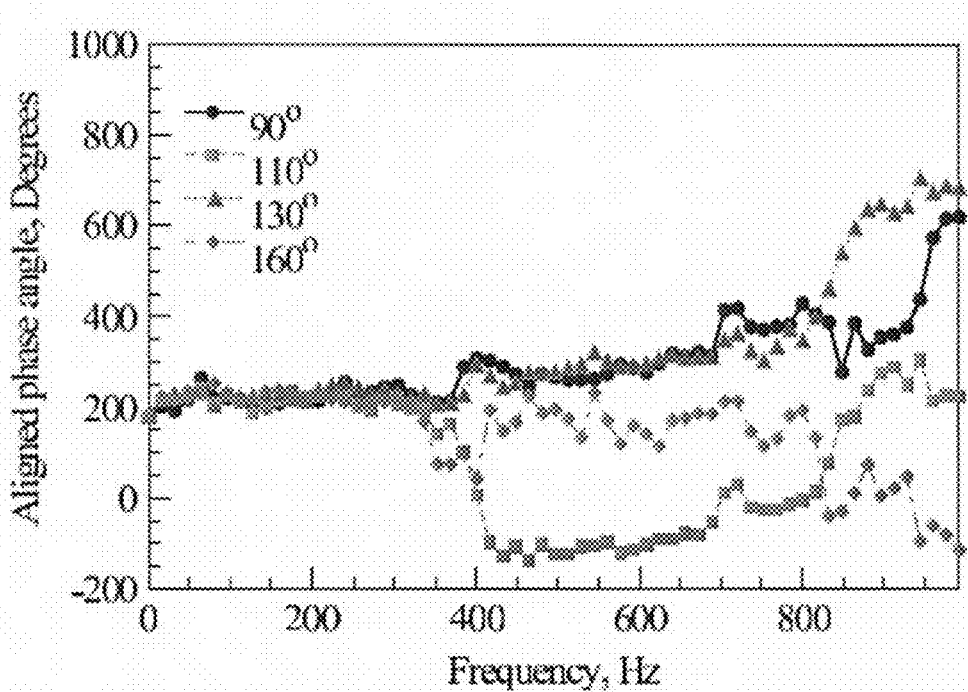
FIG. 29A is an aligned cross-spectra phase angle plot between a second turbine exit sensor and the far-field microphone at 48 percent of maximum engine power in accordance with an aspect of the innovation.
Figure 29B:
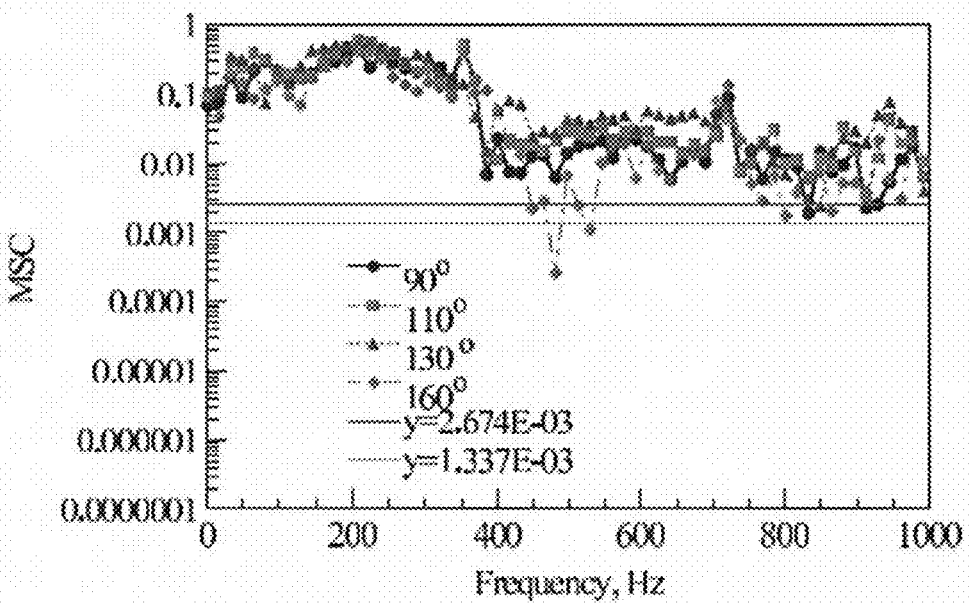
FIG. 29B is a coherence phase angle plot between the second turbine exit sensor and the far-field microphone at 48 percent of maximum engine power in accordance with an aspect of the innovation.
Figure 30A:
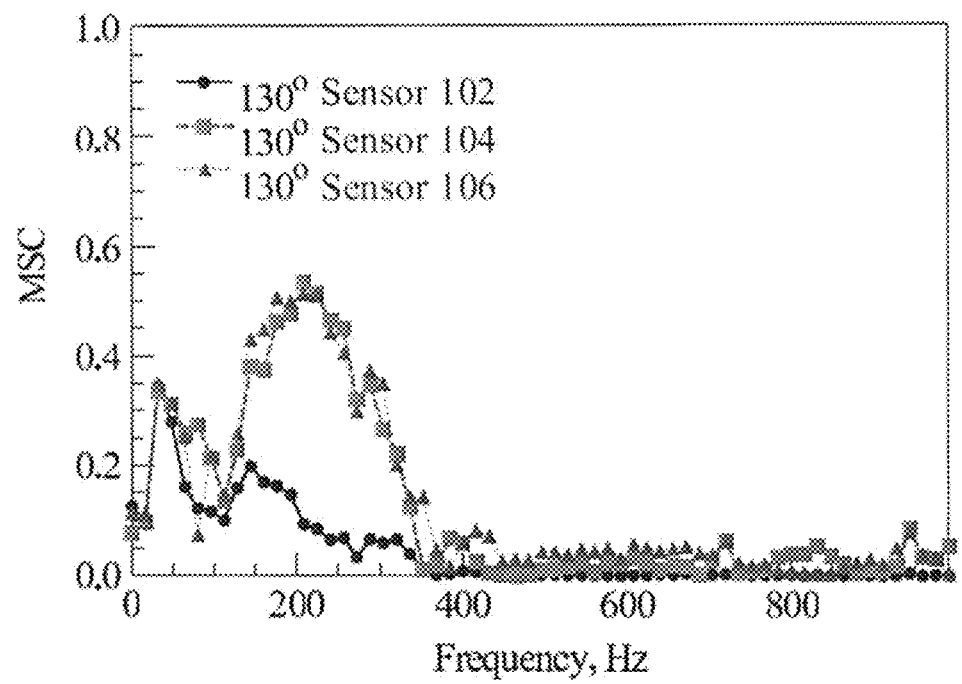
FIGS. 30A and 30B are comparison aligned coherence plots between the combustor pressure sensor and the far-field microphone at 130 degrees and the first and second turbine pressure sensors and the far-field microphone at 130 degrees in a linear and logarithmic scale respectively in accordance with an aspect of the innovation.
Figure 30B:
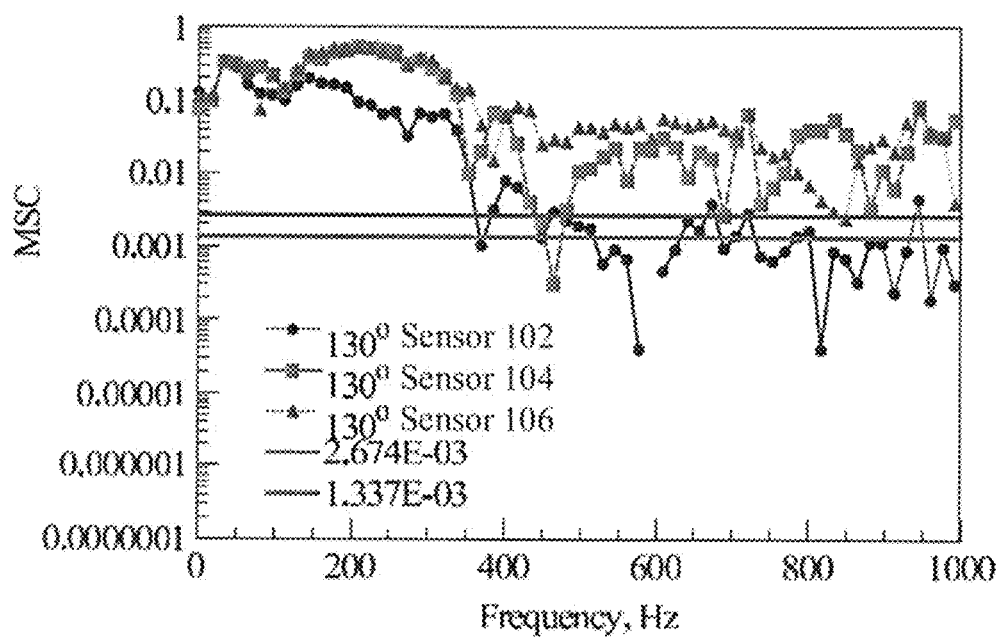

Aligned MSC and cross-spectrum phase measurements between the combustor pressure sensor 102 and various far-field microphones M at 48 percent maximum power operating conditions are shown in FIGS. 27A and 27B. Aligned MSC and cross-spectra phase measurements between turbine exit pressure sensor 104 and various far-field microphones M are shown in FIGS. 28A and 28B. Aligned MSC and cross-spectra phase measurements between turbine exit pressure sensor 106 and various far-field microphones M are shown in FIGS. 29A and 29B.

The magnitude-squared coherence function (MSC) plots will be discussed using logarithmic scales shown in FIGS. 27B, 28B, 29B, and 30B. FIGS. 27B, 28B, 29B, and 30B also illustrate MSC thresholds calculated from Equation (74). The 95 percent threshold confidence interval based on ns=1120 independent samples is 2.67×10-3. However, the spectra are calculated using a 50 percent overlap to reduce the variance and the 95 percent threshold confidence interval based on ns=2240 samples is $1.337 \times 10^{-3}$. These indicators show the MSC function is reliable up to about 400 Hz even though the pattern matching method used only cross-spectrum phase information from 16 to 208 Hz. However, MSC function is above 0.1 in a region from 16-208 Hz. The slope change in FIG. 27A above 200 Hz indicates that indirect combustion noise is important below 200 Hz and direct combustion noise is important above 200 Hz.

In order to evaluate the relative strength of indirect combustion noise and the turbine exit coherent broadband noise which contains both indirect and direct combustion noise a comparison of aligned MSC between combustor pressure sensor 102 and far-field microphone M at 130 degrees with aligned MSC between turbine pressure sensors 104, 106 and far-field microphones M at 48 percent maximum power is shown in FIGS. 10A (linear scale) and 10B (logarithmic scale). FIG. 10B also shows MSC threshold plots for ns=1120 and ns=2240 samples. FIGS. 10A and 10B illustrate that both indirect and direct combustion noise are important below 400 Hz.

Referring to FIGS. 18, 31A, 31B, and 31C, a method having several routines 3100A, 3100B, 3100C of measuring the post-combustion residence time in a gas-turbine engine is described respectively in accordance with an aspect of the innovation. The system 1800 processes information from the sensors described above to determine the post-combustion residence time in the gas-turbine engine, as will be subsequently described.

Figure 31A:
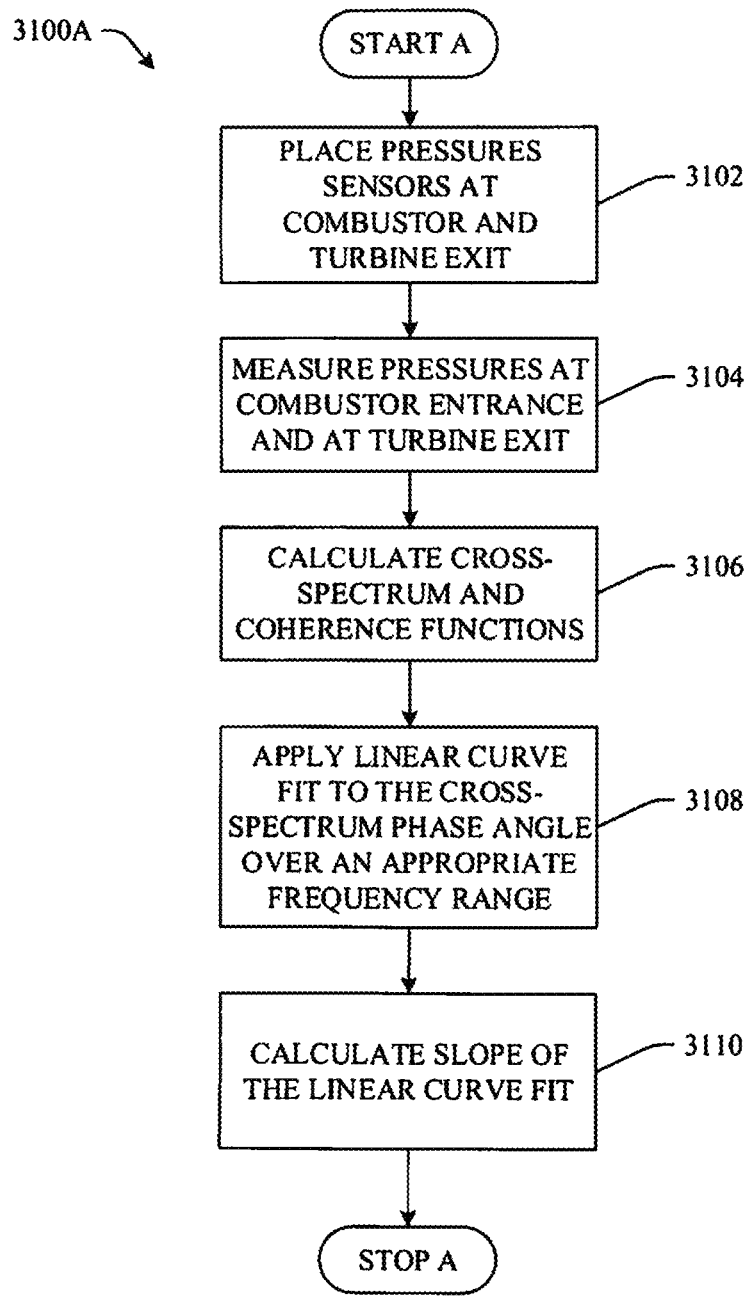
FIGS. 31A-31C illustrate an example flow chart of a procedure that measures post-combustion residence time in a gas-turbine engine in accordance with an aspect of the innovation.

Specifically, starting with routine 3100A shown in FIG. 31A at 3102, the combustor sensor 102 is placed at the combustor entrance, and the first and second turbine exit sensors 104, 106 are placed at the turbine exit, as described above in reference to FIG. 1. At 3104, the combustor sensor 102 measures the combustor pressure at the combustor entrance and the first and second turbine exit sensors 104, 106 measure turbine exit pressures at the turbine exit. At 3106, the cross-spectrum functions, specifically phase angle and coherence functions, are computed from the signals generated by the pressure sensors. Specifically, the receiving/calculation component 1810 receives the signals sent from the combustor sensor 102, and the first and second turbine exit sensors 104, 106. Upon receipt of the signals, the receiving/calculation component 1810 calculates the cross-spectrum and coherence functions. At 3108, a linear curve fit is made to the cross-spectrum phase angle over an appropriate frequency range as determined by the coherence function being greater than 0.1. Specifically, the tabulation component 1820 determines the linear curve fit and tabulates the linear curve fit results in a table, as illustrated in Tables 2 and 3 above. At 3110, the tabulation component further calculates a slope of the linear curve fit and routine A stops.

Figure 31B:
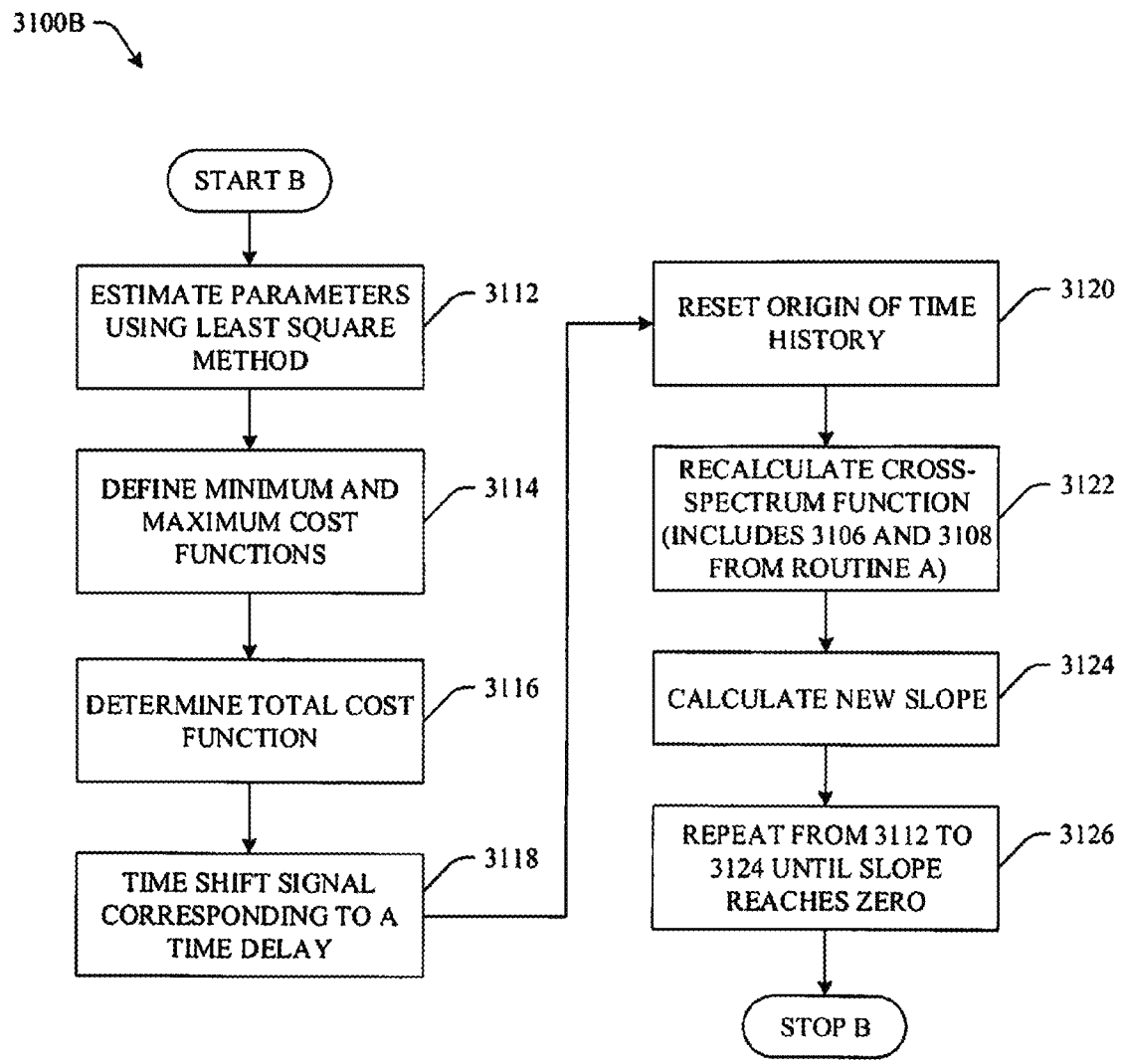

Referring to FIG. 31B, routine B 3100B begins and at 3112, parameters are estimated using the least square method to thereby minimize a sum of squares of the vertical distances. At 3114, minimum and maximum cost functions are defined to prevent the search from diverging. At 3116 the total cost function is determined. At 3118, the algorithm times shifts the signal from the turbine an amount corresponding to the time delay. At 3120, the time shift resets the origin of the time history. At 3122, the cross spectrum between the signals and is re-calculated by performing 3106 and 3108 from routine A. At 3124, a new slope is calculated. At 3126, beginning at 3112 the algorithm repeats through 3124 until the slope of the curve is zero, via the computation component 1830 and routine B stops since the time shift creating the zero slope has been evaluated.

Figure 31C:
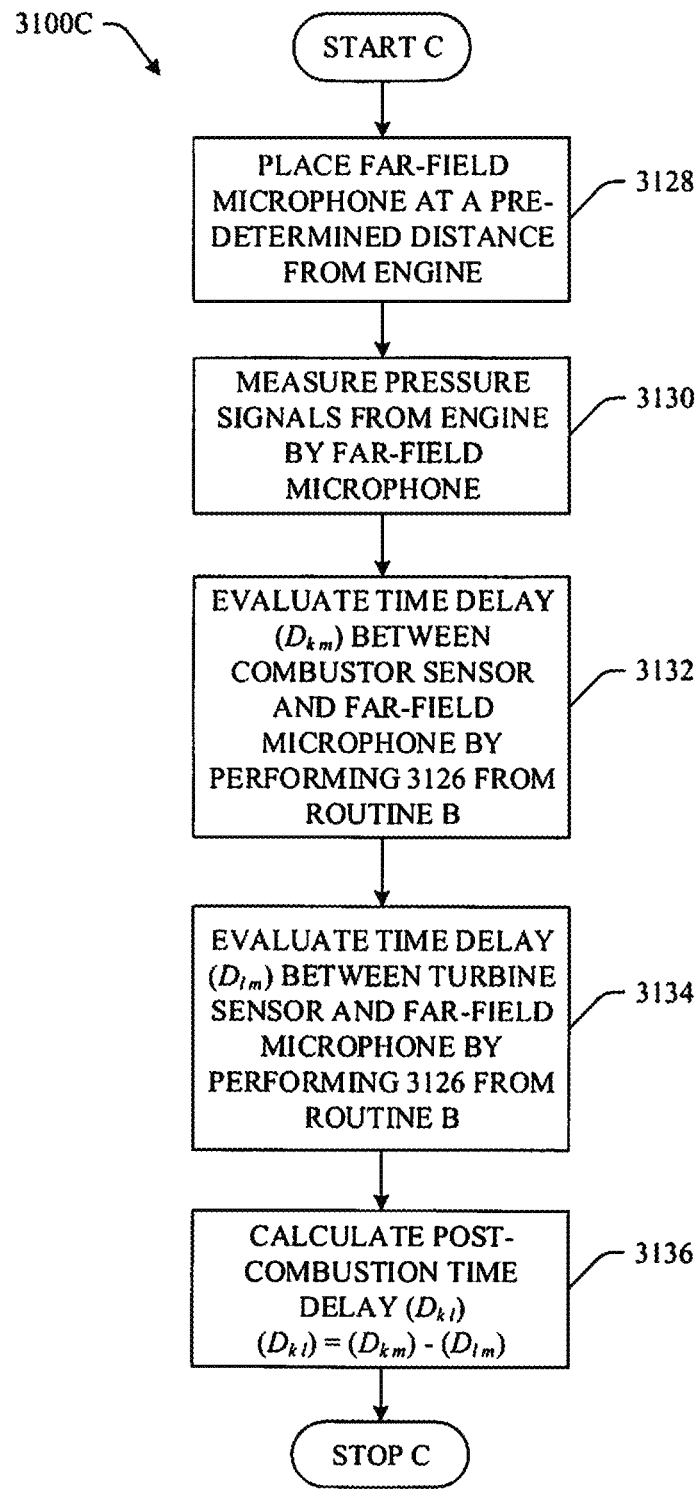

Referring to FIG. 31C, routine C begins and at 3128, far-field microphones M are placed at a pre-determined distance from the engine 100. At 3130, pressure signals from the engine are captured by the far-field microphones M. At 3132, the time delay (first time delay) $D_{km}$ is evaluated, via the computation component 1830, between the signal from the combustor sensor 102 and the far-field microphones M by repeating 3112 through 3124 from routine B until the slope reaches zero. At 3134, the time delay (second time delay) $D_{lm}$ is evaluated, via the computation component 1830, between each of the first and second turbine exit sensors 104, 106 and the far-field microphones M by repeating 3112 through 3124 from routine B until the slope reaches zero. At 3136, the post-combustion time delay (third time delay) $D_{kl}$ is calculated by taking the difference between the first time delay $D_{lm}$ and the second time delay $D_{l\,m}$, which is shown in Eq. 94.

$$D_{kl}=D_{km}-D_{lm} \quad (94)$$

A phase-based adaptive estimation pattern matching approach has been developed to estimate the post combustion (post-flame) time delay in the combustor from cross-spectral phase measurements made using a combustor pressure sensor, two turbine exit pressure sensors, and far-field microphones M by estimating the propagation time to the far field for the indirect combustion noise and the turbine exit coherent broadband noise, and taking the difference. The procedure estimates the post-combustion/post-flame residence time in the combustor. It is the presence of indirect combustion noise that makes the procedure feasible. While the method has general application, the method discussed works well in this particular case due to the nature of the data set. The number of independent averages is chosen to be large (ns≈1120) and the magnitude-squared coherence (MSC) is over 0.1 up to 208 Hz making the standard deviation of the cross-spectra phase small below 200 Hz. An algorithm for calculating the post-combustion (post-flame) residence time in the combustor could also be important in understanding the formation of thermal NOx in the combustor and verifying new and innovative combustor designs based on computational tools. Calculating the aligned MSC is a step that applies array processing methods to the MSC data set. In general, the adaptive estimation technique developed herein is an effective tool to determine time delays between broadband coherent signals in noisy environments such as those that exist in real aircraft engines.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of measuring a residence time in a gas-turbine engine:
    measuring a combustor pressure signal at a combustor entrance and a turbine exit pressure signal at a turbine exit;
    computing a cross-spectrum function between the combustor pressure signal and the turbine exit pressure signal;
    calculating a slope of the cross-spectrum function;
    shifting the turbine exit pressure signal an amount corresponding to a time delay between the measurement of the combustor pressure signal and the turbine exit pressure signal; and
    recalculating the slope of the cross-spectrum function until the slope reaches zero.

2. The method of claim 1, wherein prior to measuring a combustor pressure signal at a combustor entrance and a turbine exit pressure signal at a turbine exit the method further comprising placing a plurality of pressure sensors at a combustor entrance and at a turbine exit of the gas-turbine engine.

3. The method of claim 2, wherein the plurality of pressure sensors includes a combustor pressure sensor disposed at a combustor entrance, a first turbine exit pressure sensor disposed at a first turbine exit, and a second turbine exit pressure sensor disposed at a second turbine exit.

4. The method of claim 3 further comprising computing a post-combustion residence time from the slope of the cross spectrum function.

5. The method of claim 4, wherein prior to calculating a slope of the cross-spectrum function, the method further comprising applying a linear curve fit to the cross-spectrum function.

6. The method of claim 3 further comprising placing at least one far-field microphone at a pre-determined distance from the gas-turbine engine.

7. The method of claim 6 further comprising measuring a pressure signal at the at least one far-field microphone.

8. The method of claim 7 further comprising computing a cross-spectrum function between the combustor pressure sensor signal from the measured combustor pressure and the pressure signal measured at the at least one far-field microphone.

9. The method of claim 8 further comprising applying a linear curve fit to the cross-spectrum function and calculating a slope of the linear curve fit.

10. The method of claim 9 further comprising re-calculating the slope of the linear curve fit until the slope reaches zero.

11. A method of measuring a residence time in a gas-turbine engine:
measuring a first turbine exit pressure signal at a turbine exit and a pressure signal at a far-field microphone;
computing a cross-spectrum function between the first turbine exit pressure signal and the pressure signal measured at the at least one far-field microphone;
calculating a slope of the cross-spectrum function;
shifting the pressure from the at least one far-field microphone an amount corresponding to a time delay between the measurement of the first turbine exit pressure signal and the pressure signal measured at the at least one far-field microphone; and
recalculating the slope of the cross-spectrum function until the slope reaches zero.

12. The method of claim 11 further comprising a measuring a second turbine exit pressure signal at the turbine exit.

13. The method of claim 12 further comprising computing a cross-spectrum function between the second turbine exit pressure signal and the pressure signal measured at the at least one far-field microphone.

14. The method of claim 13 further comprising calculating a slope of the cross-spectrum function between the second turbine exit pressure signal and the pressure signal measured at the at least one far-field microphone.

15. The method of claim 14 further comprising shifting the pressure signal from the at least one far-field microphone an amount corresponding to a time delay between the measurement of the second turbine exit pressure signal and the pressure signal measured at the at least one far-field microphone.

16. The method of claim 15 further comprising recalculating the slope of the cross-spectrum function between the second turbine exit pressure signal and the pressure signal measured at the at least one far-field microphone until the slope reaches zero.

17. A system to measure a post-combustion residence time in a gas-turbine engine comprising:
a measurement component that measures combustion pressure signals, turbine exit pressure signals, and far-field pressure signals from far-field microphones;
a receiving/calculation component that calculates a plurality of cross-spectrum functions based on the measured plurality of combustion pressure signals, turbine exit pressure signals, and far-field pressure signals;
a tabulation component that tabulates a slope of a linear curve fit over a predetermined frequency range based on the calculated plurality of the cross-spectrum functions; and
a computation component that computes the post-combustion residence time in the gas-turbine engine.

18. The system of claim 17, wherein the tabulation component shifts at least one of the turbine exit pressure signals an amount corresponding to a time delay between the measurement of at least one of the combustor pressure signals and the at least one of the turbine exit pressure signals and recalculates the slope of the cross-spectrum function between the at least one of the combustor pressure signals and the at least one of the turbine exit pressure signals until the slope reaches zero.

19. The system of claim 17, wherein the tabulation component shifts at least one of the far-field pressure signals an amount corresponding to a time delay between the measurement of at least one of the combustor pressure signals and the at least one of the far-field pressure signals and recalculates the slope of the cross-spectrum function between the at least one of the combustor pressure signals and the at least one of the far-field pressure signals until the slope reaches zero.

20. The system of claim 17, wherein the tabulation component shifts at least one of the far-field pressure signals an amount corresponding to a time delay between the measurement of at least one of the turbine exit pressure signals and the at least one of the far-field pressure signals and recalculates the slope of the cross-spectrum function between the at least one of the turbine exit pressure signals and the at least one of the far-field pressure signals until the slope reaches zero.

* * * * *